(12) United States Patent
Oike et al.

(10) Patent No.: US 7,750,278 B2
(45) Date of Patent: Jul. 6, 2010

(54) SOLID-STATE IMAGING DEVICE, METHOD FOR DRIVING SOLID-STATE IMAGING DEVICE AND CAMERA

(75) Inventors: Yusuke Oike, Kanagawa (JP); Masanori Kasai, Kanagawa (JP); Shinichi Yoshimura, Tokyo (JP); Atsushi Toda, Kanagawa (JP); Tadayuki Taura, Kanagawa (JP); Hiroki Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 440 days.

(21) Appl. No.: 11/671,592

(22) Filed: Feb. 6, 2007

(65) Prior Publication Data

US 2008/0173794 A1 Jul. 24, 2008

(30) Foreign Application Priority Data

Feb. 9, 2006 (JP) .......................... P2006-031932

(51) Int. Cl.
*H01L 27/14* (2006.01)
(52) U.S. Cl. .............................. 250/208.1; 250/214 R; 250/226
(58) Field of Classification Search ............ 250/214 R, 250/208.1, 226
See application file for complete search history.

(56) References Cited

U.S. PATENT DOCUMENTS

| | | | |
|---|---|---|---|
| 5,990,471 A | 11/1999 | Watanabe | |
| 6,437,378 B1 * | 8/2002 | Park | ........................... 257/241 |
| 6,580,063 B1 * | 6/2003 | Okamoto | .................. 250/208.1 |
| 6,850,278 B1 * | 2/2005 | Sakurai et al. | .............. 348/302 |
| 7,486,313 B2 * | 2/2009 | Milkov et al. | ............ 348/223.1 |
| 2004/0070680 A1 | 4/2004 | Oda | |
| 2005/0045980 A1 | 3/2005 | Guidash | |
| 2005/0212939 A1 | 9/2005 | Oda | |
| 2005/0225655 A1 * | 10/2005 | Suzuki | ........................ 348/272 |
| 2005/0230774 A1 | 10/2005 | Suzuki | |

FOREIGN PATENT DOCUMENTS

| | | |
|---|---|---|
| JP | 63-266872 | 11/1988 |
| JP | 06-153089 | 5/1994 |
| JP | 2001-333328 | 11/2001 |
| JP | 2002-314875 | 10/2002 |
| JP | 2003-244396 | 8/2003 |
| JP | 2004-140149 | 5/2004 |
| JP | 2004-363666 | 12/2004 |
| JP | 2005-072966 | 3/2005 |
| JP | 2006-033381 | 2/2006 |

OTHER PUBLICATIONS

European Search Report dated May 9, 2007.
Japanese Office Action issued on Dec. 1, 2009 in connection with corresponding JP Application No. 2006-031932.

* cited by examiner

*Primary Examiner*—Seung C Sohn
(74) *Attorney, Agent, or Firm*—Sonnenschein Nath & Rosenthal LLP

(57) ABSTRACT

A solid-state imaging device including an array of a plurality of first pixels and a plurality of second pixels with higher sensitivity than the first pixels, a first control signal line that controls the first pixels, and a second control signal line that controls the second pixels, wherein the first control signal line and the second control signal line are driven independent of each other.

20 Claims, 26 Drawing Sheets

FIG. 4
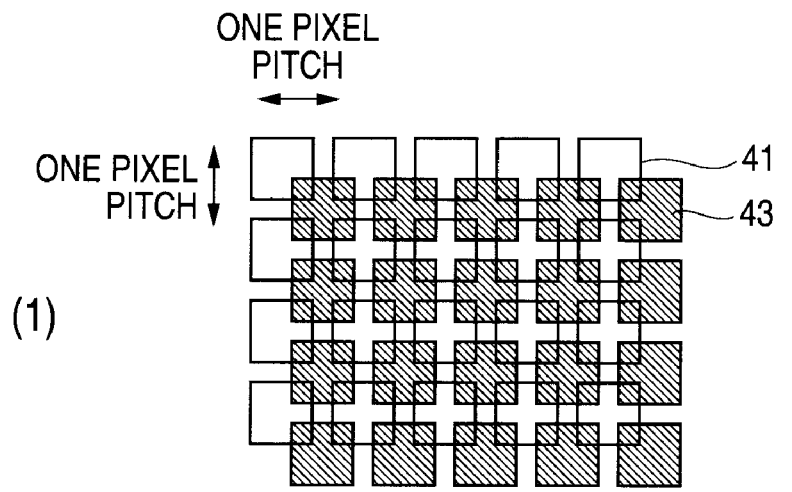
(1)
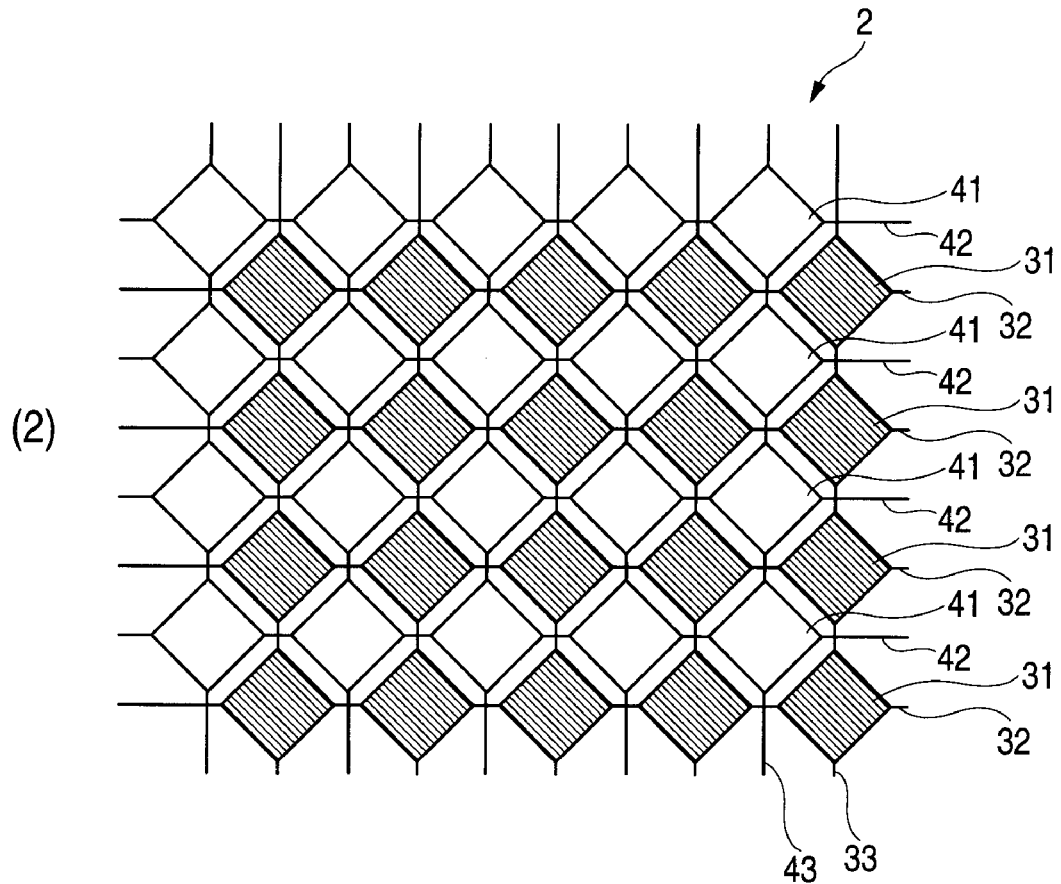
(2)

FIG. 12
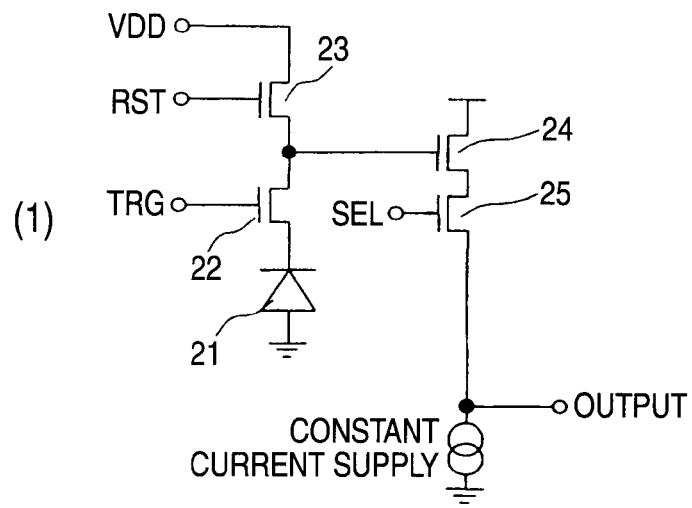
(1)
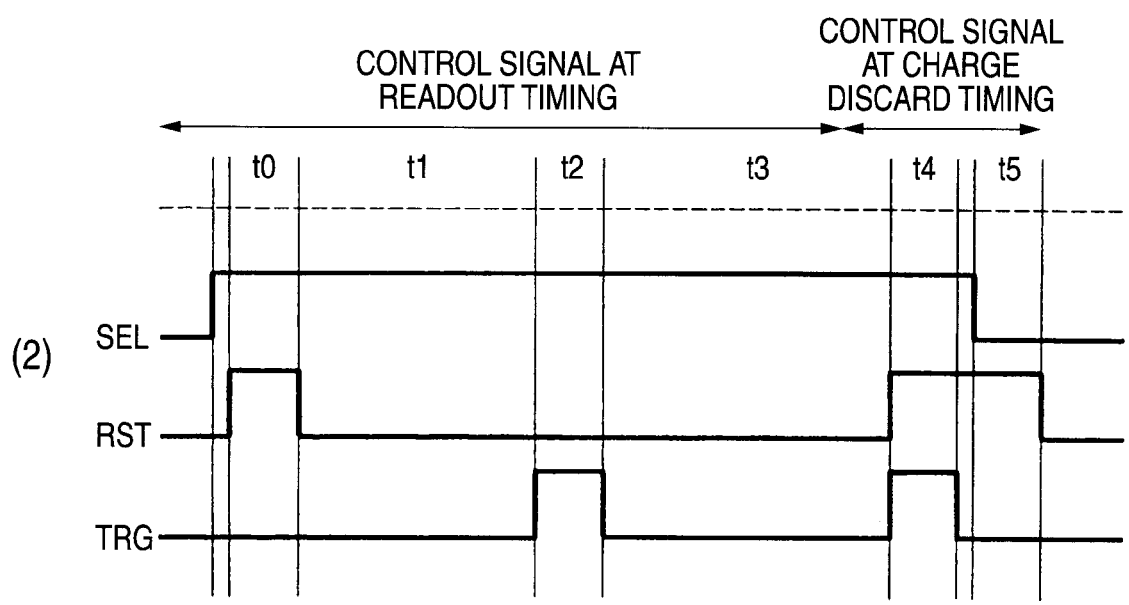
(2)

SOLID-STATE IMAGING DEVICE, METHOD FOR DRIVING SOLID-STATE IMAGING DEVICE AND CAMERA

CROSS REFERENCES TO RELATED APPLICATIONS

The present invention contains subject matter related to Japanese Patent Application JP 2006-031932 filed in the Japanese Patent Office on Feb. 9, 2006, the entire contents of which being incorporated herein by reference.

BACKGROUND OF THE INVENTION

1. Field of the Invention

The invention relates to a solid-state imaging device, a method for driving the solid-state imaging device and a camera.

2. Description of the Related Art

In a solid-state imaging device of related art, the same exposure time is applied to all pixels on the imaging plane. Even in the technology that enables a wide dynamic range by applying multiple numbers of exposure time in multiple imaging operations and integrating the resultant images (see JP-A-2004-363666, for example), the same exposure time is applied to all pixels. Thus, in a mixed pixel configuration in which some pixels have different sensitivity from the other, selection will be made in such a way that a short exposure time is set to prevent saturation of the pixels having high sensitivity, or a long exposure time is set to obtain a sufficiently large signal from the pixels having low sensitivity but saturate the high-sensitivity pixels. In this description, pixels having high sensitivity (high-sensitivity pixels) refer to pixels having higher sensitivity than pixels having low sensitivity (low-sensitivity pixels).

For example, when the exposure time is set such that the pixels having high sensitivity are not saturated, sufficient signal charge will not be obtained from the pixels having low sensitivity, resulting in a reduced S/N ratio. On the other hand, when the exposure time is set such that sufficient signal charge will be obtained from the pixels having low sensitivity, the pixels having high sensitivity are undesirably saturated.

SUMMARY OF THE INVENTION

It is desirable to solve the problem that when the exposure time is set such that the pixels having high sensitivity are not saturated, sufficient signal charge will not be obtained from the pixels having low sensitivity, resulting in a reduced S/N ratio, while when the exposure time is set such that sufficient signal charge will be obtained from the pixels having low sensitivity, the pixels having high sensitivity is saturated.

Thus, it is desirable to achieve a wide dynamic range without reducing the S/N ratio of the pixels having low sensitivity and without saturating the pixels having high sensitivity.

According to an embodiment of the invention, there is provided a solid-state imaging device having an array of a plurality of first pixels and a plurality of second pixels with higher sensitivity than the first pixels. The solid-state imaging device includes a first control signal line that controls the first pixels and a second control signal line that controls the second pixels, and the first control signal line and the second control signal line are driven independent of each other.

In the solid-state imaging device according to the above embodiment, since the first control signal line that controls the first pixels and the second control signal line that controls the second pixels are driven independent of each other such that the first pixels and the second pixels with higher sensitivity than the first pixels are driven independent of each other, it is possible to simultaneously apply different types of exposure time and readout timing to the first pixels and the second pixels with higher sensitivity than the first pixels.

According to the above embodiment of the invention, since different types of exposure time and readout timing can be applied to the first pixels and the second pixels with higher sensitivity than the first pixels, a long exposure time can be set to the first pixels having lower sensitivity than the second pixels so as to obtain a sufficiently large signal and hence prevent reduction in the S/N ratio, while a short exposure time can be set to the second pixels having higher sensitivity than the first pixels so as to prevent saturation. In this way, a wide dynamic range can be achieved.

BRIEF DESCRIPTION OF THE DRAWINGS

FIGS. 4A and 4B are layout diagrams showing another embodiment (third example) of the invention;

FIG. 12A shows an exemplary configuration of the pixel circuit showing another embodiment (tenth example) of the invention;

FIG. 12B is a timing chart showing another embodiment (tenth example) of the invention;

DESCRIPTION OF THE PREFERRED EMBODIMENTS

In the following description, "discrepancy" in exposure time means disagreement of the exposure timing between the low-sensitivity pixels and the high-sensitivity pixels in an arbitrary row, and "misalignment" of exposure time means the "discrepancy" varies depending on a readout row.

Firstly, an embodiment (first example) of the invention will be described with reference to the layout diagram shown in FIG. 1.

Figure 1:
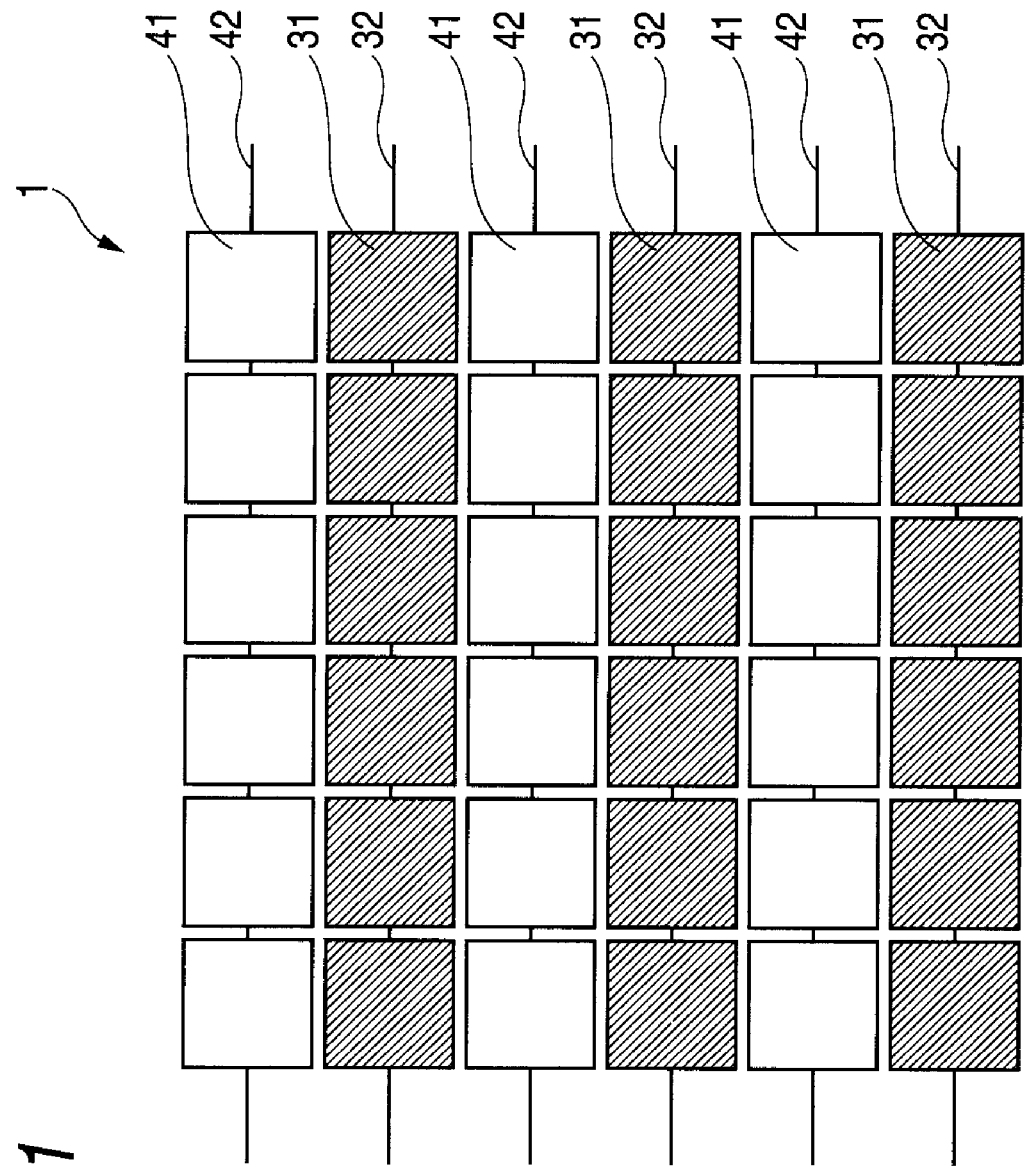
FIG. 1 is a layout diagram showing an embodiment (first example) of the invention.

As shown in FIG. 1, a solid-state imaging device 1 has pixels arranged in a matrix two-dimensionally in the vertical direction (x direction) and the horizontal direction (y direction). There are first and second horizontal pixel rows alternately arranged in the vertical direction. The first pixel row is formed of a plurality of first pixels 31 arranged in the row direction and the second pixel row is formed of a plurality of second pixels 41, each having higher sensitivity than that of the first pixel 31, arranged in the row direction.

The first pixels 31 in the first pixel row are connected to a first control signal line 32 and controlled. The second pixels 41 in the second pixel row are connected to a second control signal line 42 and controlled independent of the first control signal lines 32. Thus, by using a horizontal scan circuit by which the first control signal line 32 and the second control signal line 42 are independently controlled, the first pixels 31 in the row direction can be controlled independent of the second pixel row formed of the second pixels 41 in the row direction, each having higher sensitivity than that of the first pixel 31.

Since the first pixels 31, which are low-sensitivity pixels, and the second pixels 41, which are high-sensitivity pixels, are driven independent of each other, the timing of electronic shuttering can be independently set to adjust the exposure time. In this way, correct exposure can be applied to both the first pixels 31 and the second pixel 41, that is, it is possible to drive the low-sensitivity first pixels 31 to acquire sufficient signal charge, while preventing saturation of the high-sensitivity second pixel 41.

An example of a MOS image sensor having a pixel arrangement in which the first control signal line 32 and the second control signal line 42 can be independently controlled will be described below with reference to the system configuration diagram shown in FIG. 2.

Figure 2:
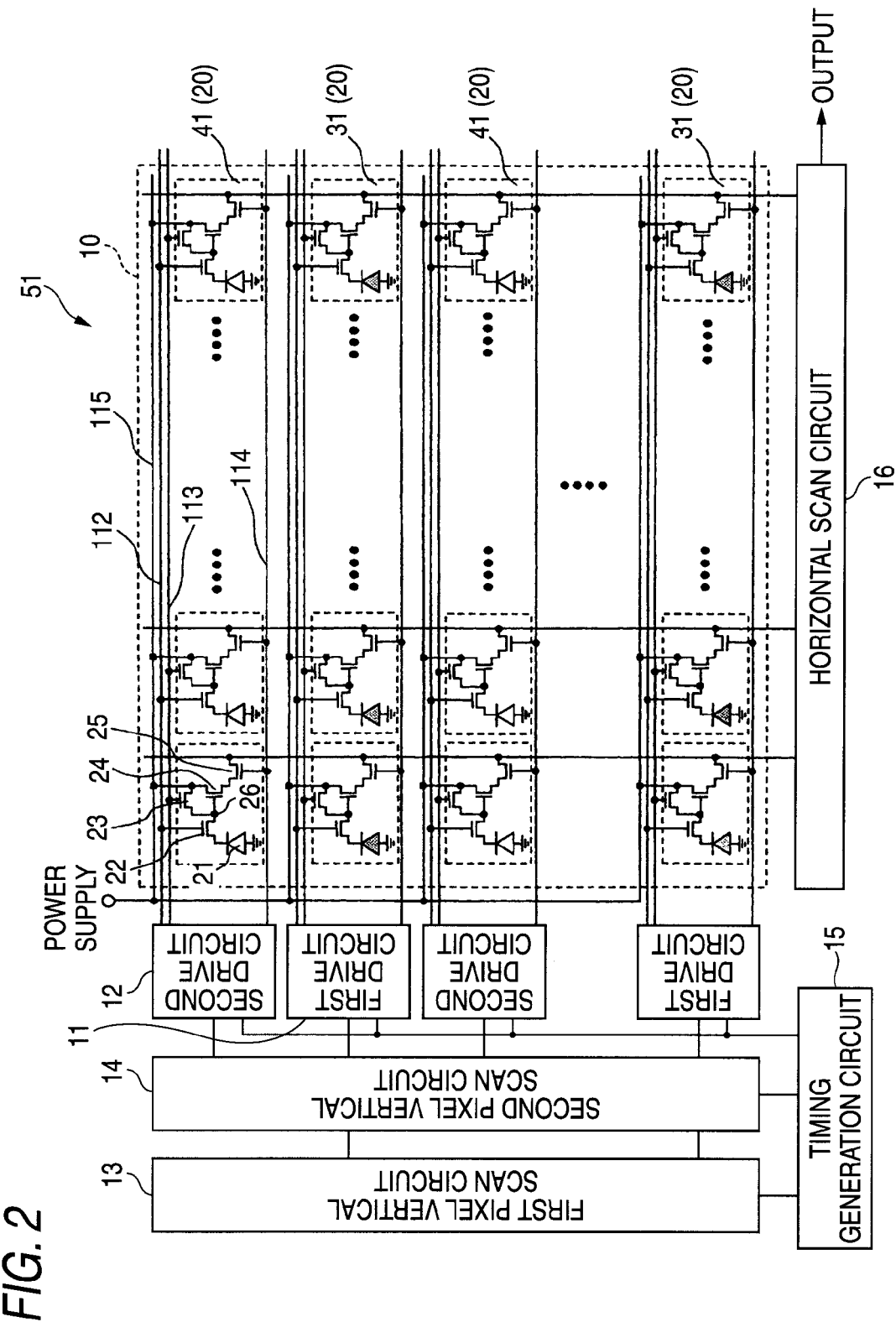
FIG. 2 is a system configuration diagram showing an example of a MOS image sensor having the pixel arrangement of the first example.

As shown in FIG. 2, a MOS image sensor 51 includes a pixel array 10 having unit pixels (the first pixels 31 and the second pixels 41 having higher sensitivity than the first pixels 31), each including a photoelectric conversion element, two-dimensionally arranged in a matrix. The MOS image sensor 51 also includes, as peripheral circuits of the pixel array 10, a first drive circuit 11 that independently controls the first control signal line, a second drive circuit 12 that independently controls the second control signal line, a first pixel vertical scan circuit 13, a second pixel vertical scan circuit 14, a timing generation circuit 15 and a horizontal scan circuit 16.

The matrix arrangement of the first pixels 31 and the second pixels 41 in the pixel array 10 has output signal lines 111 wired to each column as well as the first control signal line and the second control signal line wired to each row of the first pixels 31 and the row of the second pixels 41, respectively. Each of the control signal lines include a transfer control line 112, a reset control line 113 and a selection control line 114. Furthermore, a reset line 115 that supplies a reset voltage is wired to each of the unit pixels 20 (the first pixels 31 and the second pixels 41).

FIG. 2 also shows an exemplary circuit configuration of the first pixel 31 and the second pixel 41. The pixel circuit of the unit pixel according to this exemplary circuit includes the photoelectric conversion element, such as a photodiode 21, as well as four transistors, for example, a transfer transistor 22, a reset transistor 23, an amplification transistor 24 and a selection transistor 25. In this description, N-channel MOS transistors are used by way of example as the transfer transistor 22, the reset transistor 23, the amplification transistor 24 and the selection transistor 25.

The transfer transistor 22 is connected between the cathode electrode of the photodiode 21 and a floating diffusion section 26 that is a charge-to-voltage converter, and transfers signal charge (electrons in this example) photoelectrically converted and accumulated in the photodiode 21 to the floating diffusion section 26 in response to a transfer pulse TRG provided to the gate electrode (control electrode).

The drain electrode and the source electrode of the reset transistor 23 are connected to the reset line 115 and the floating diffusion section 26, respectively. The reset transistor 23 resets the potential at the floating diffusion section 26 to a reset voltage Vrst in response to a reset pulse RST provided to the gate electrode before the signal charge is transferred from the photodiode 21 to the floating diffusion section 26.

The gate electrode and the drain electrode of the amplification transistor 24 are connected to the floating diffusion section 26 and a pixel power supply Vdd, respectively. The amplification transistor 24 outputs the potential at the floating diffusion section 26 as the reset level after the potential is reset by the reset transistor 23 and outputs the potential at the floating diffusion section 26 as the signal level after the signal charge is transferred by the transfer transistor 22.

The drain electrode and the source electrode of the selection transistor 25 are connected to the source electrode of the amplification transistor 24 and the output signal line 111, respectively. The selection transistor 25 is, for example, turned on in response to a selection pulse SEL provided to the gate electrode to turn the pixel (the first pixel 31 or the second pixel 41) into the selected state so as to output the signal outputted from the amplification transistor 24 to the output signal line 111. It is also possible to connect the selection transistor 25 between the pixel power supply Vdd and the drain electrode of the amplification transistor 24. Therefore, the circuit configuration of the first pixel 31 is the same as that of the second pixel 41.

The drive circuits (the first drive circuit 11 and the second drive circuit 12) read out signals of the first pixels 31 and the second pixels 41 in the readout row in the pixel array 11.

Each of the first pixel vertical scan circuit 13 and the second pixel vertical scan circuit 14 is formed of a shift resister, an address decoder or the like. The first and second pixel vertical scan circuits 13 and 14 generate the reset pulse RST, the transfer pulse TRG, the selection pulse SEL and the like as appropriate to scan the first pixels 31 and the second pixels 41 in the pixel array 11 on a row basis for the electronic shutter row and the readout row in the vertical direction (up/down direction), while performing an electronic shutter operation on the electronic shutter row in order to discard the signals of the first pixels 31 or the second pixels 41 in that row. Before the first drive circuit 11 and the second drive circuit 12 performs the readout scan by the time corresponding to the shutter speed, the electronic shutter operation is performed on the same row (electronic shutter row).

The horizontal scan circuit 16 is formed of a shift resister, an address decoder or the like and sequentially performs horizontal scan for each pixel row in the pixel array 10. The timing generation circuit 15 generates timing signals and control signals used as reference signals for the operations of the first drive circuit 11, the second drive circuit 12, the first pixel vertical scan circuit 13, the second pixel vertical scan circuit 14 and the like.

Another embodiment (second example) of the invention will be described below with reference to the system configuration diagram shown in FIG. 3.

Figure 3:
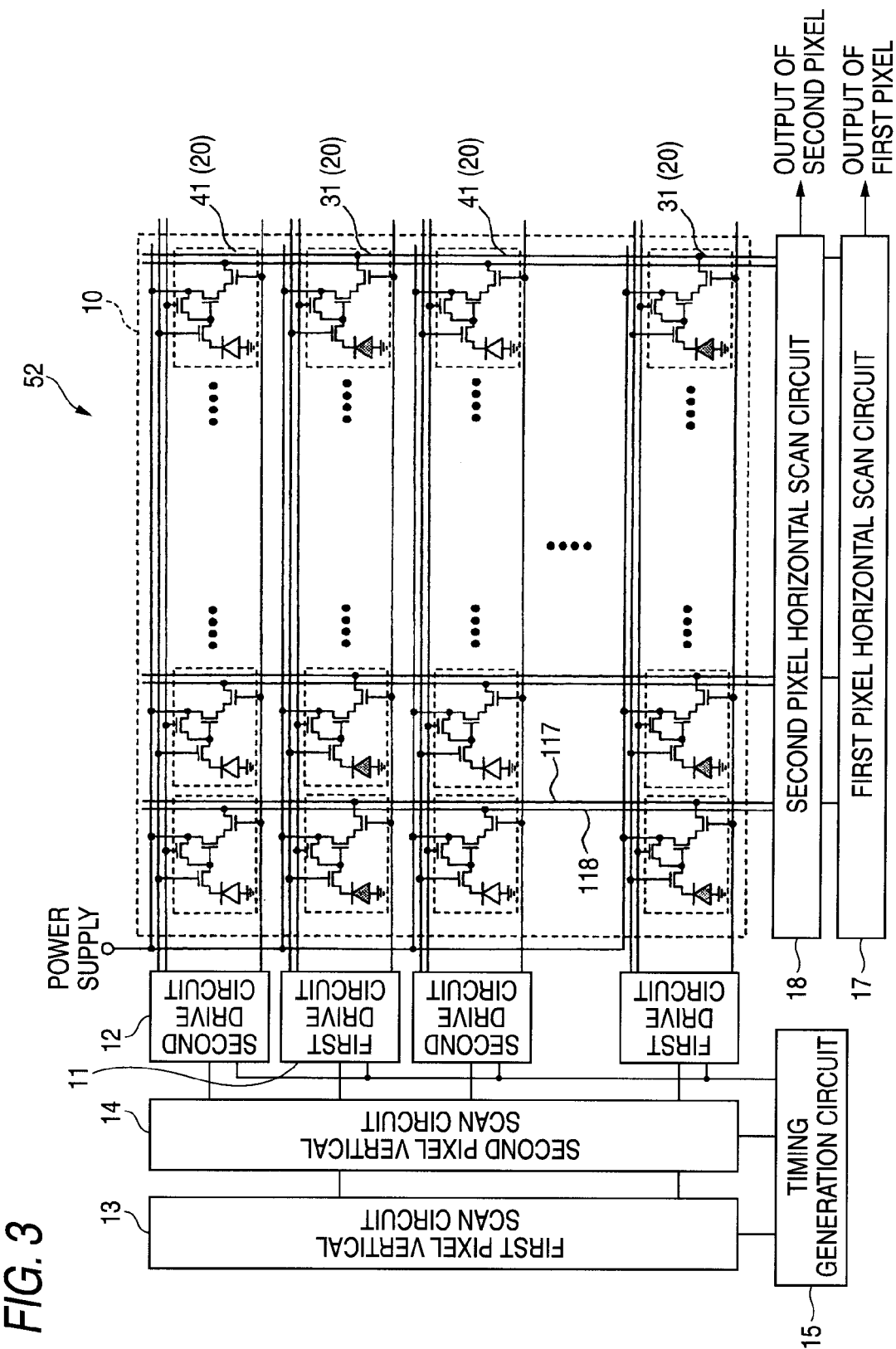
FIG. 3 is a system configuration diagram showing another embodiment (second example) of the invention.

As shown in FIG. 3, a MOS image sensor 52 includes the pixel array 10 having unit pixels 20 (the first pixels 31 and the second pixels 41), each including the photoelectric conversion element, two-dimensionally arranged in a matrix. The MOS image sensor 52 also includes, as peripheral circuits of the pixel array 10, the first drive circuit 11 that independently controls the first control signal line, the second drive circuit 12 that independently controls the second control signal line, the first pixel vertical scan circuit 13, the second pixel vertical scan circuit 14, the timing generation circuit 15 and a first horizontal scan circuit 17 and a second horizontal scan circuit 18.

The MOS image sensor 52 is configured such that in the MOS image sensor 51 described with reference to FIG. 2, a first output signal line 117 is wired to the first pixels 31 in each column and a second output signal line 118 is wired to the second pixels 41 in each column. The first output signal lines 117 are connected to the first horizontal scan circuit 17 that horizontally scans the output signals of the first pixels 31, while the second output signal lines 118 are connected to the second horizontal scan circuit 18 that horizontally scans the output signals of the second pixels 41. Thus, the first output signal lines 117 for the low-sensitivity first pixels 31 and the second output signal lines 118 for the high-sensitivity second pixels 41 can be independently controlled.

The first pixels 31 and the second pixel 41 are driven independent of each other and the first output signal 117 and the second output signal 118 are outputted via the first horizontal scan circuit 17 and the second horizontal scan circuit 18, respectively. When the readout timing for the first pixels 31 is the same as that for the second pixels 41, the first and second pixels can share one common horizontal scan circuit. When the readout timing for the first pixels 31 is different from that for the second pixels 41, the first horizontal scan circuit 17 for the first pixels and the second horizontal scan circuit 18 for the second pixels are independently provided as described above, so that the first pixels 31 and the second pixels 41 can be read out at different timings from each other.

In the second example, the pixel arrangement is configured such that the outputs of the low-sensitivity first pixels 31 and the outputs of the high-sensitivity second pixels 41 are acquired independent of each other, so that the values of the first pixels 31 and the values of the second pixels 41 can be read out independent of each other. In this way, only the second pixels, which are high-sensitivity pixels, can be easily accessed at a high frame rate, providing an advantage of preventing saturation of the second pixels 41. It is also possible to achieve a higher S/N ratio by acquiring a plurality of frames.

Another embodiment (third example) of the invention will be described below with reference to the layout diagram shown in FIGS. 4A and 4B.

As shown in FIG. 4A, the a two-dimensional square arrangement of the low-sensitivity first pixels 31 and a two-dimensional square arrangement of the high-sensitivity second pixels 41 are overlaid such that they are shifted from each other by one-half the pixel pitch in the horizontal and vertical directions.

As shown in FIG. 4B, the two-dimensional square arrangement of the low-sensitivity first pixels 31 and the two-dimensional square arrangement of the high-sensitivity second pixels 41 are overlaid such that they are shifted from each other by one-half the pixel pitch in the horizontal and vertical directions, and the first pixels 31 and the second pixels 41 are evenly spaced apart. Specifically, diamond-shaped pixels obtained by inclining square pixels are used and the second pixels are disposed at the positions displaced from the first pixels 31 by one-half the pixel pitch in the horizontal and vertical directions. Therefore, the first pixels 31 and the second pixels 41 are arranged such that their diagonal directions agree with the row and column directions. Although an equilateral diamond is used in this example in order to simplify the pixel shape, the pixel shape may be polygonal, such as hexagonal and octagonal. Furthermore, the first control signal line 32 that controls the first pixels 31 and the second signal line 42 that controls the second pixels 41 are wired independent of each other. Moreover, the output signal line 33 for the first pixels 31 and the output signal line 43 for the second pixels 41 are wired independent of each other.

In the configuration of the solid-state imaging device 2 of the third example, the second pixels 41, which are high-sensitivity pixels, are disposed evenly spaced apart in the horizontal and vertical directions in the arrangement, so that the second pixels 41 having an excellent S/N ratio and high sensitivity increase brightness resolution, providing an advantage of improving resolution of an image.

An example of a MOS image sensor having the pixel arrangement described with reference to FIG. 4B will be described below with reference to the system configuration diagram shown in FIG. 5.

Figure 5:
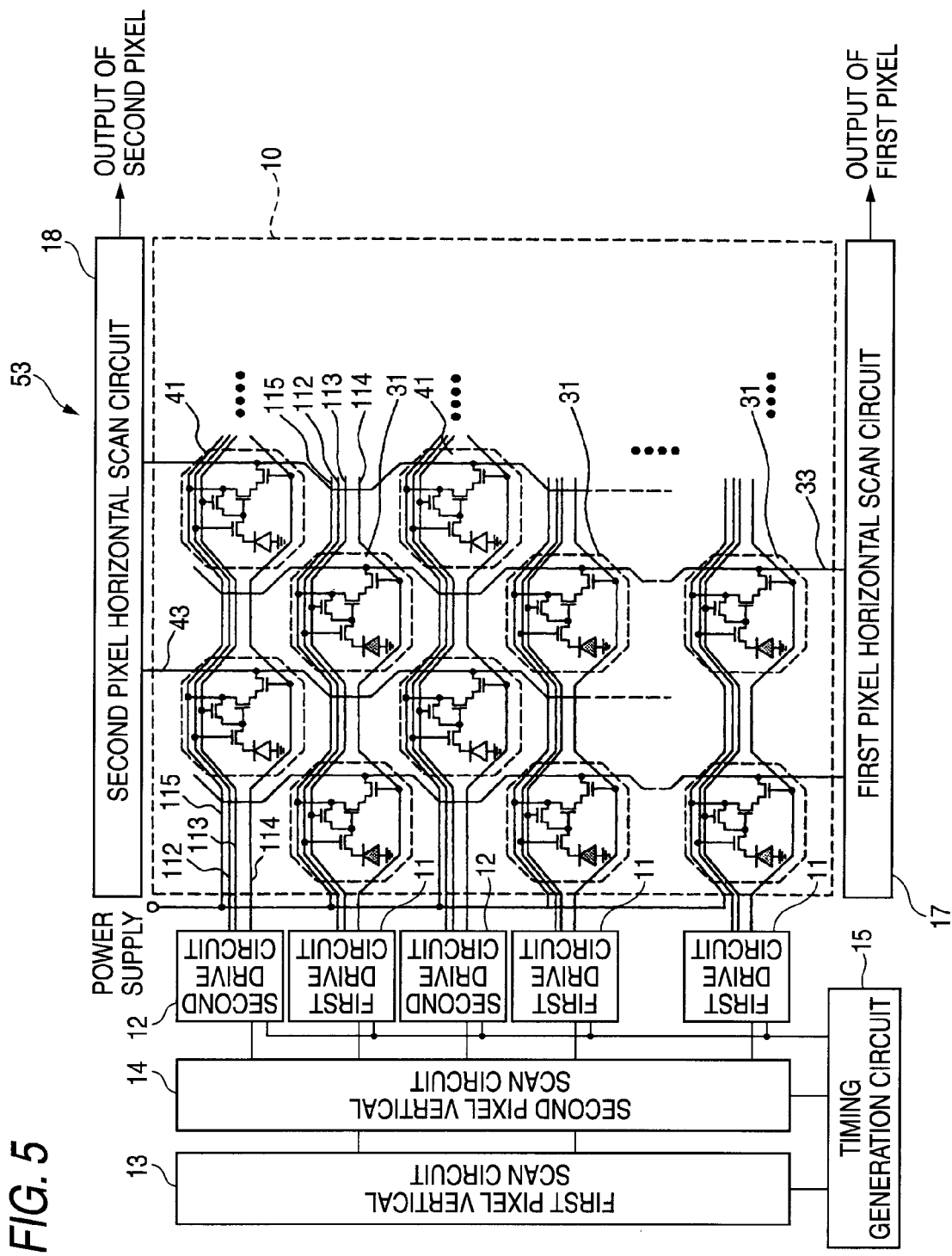
FIG. 5 is a system configuration diagram showing an example of a MOS image sensor having the pixel arrangement of the third example.

As shown in FIG. 5, a MOS image sensor 53 includes the pixel array 10 having pixels (the first pixels 31 and the second pixels 41), each including the photoelectric conversion element, two-dimensionally arranged in a matrix. The MOS image sensor 53 also includes as peripheral circuits of the pixel array 10, the first drive circuit 11 that independently controls the first control signal line, the second drive circuit 12 that independently controls the second control signal line, the first pixel vertical scan circuit 13, the second pixel vertical scan circuit 14, the timing generation circuit 15, the first pixel horizontal scan circuit 17 and the second pixel horizontal scan circuit 18.

Each of the first pixels 31 and the second pixels 41 is formed into a polygonal shape (for example, an octagonal shape in the figure), and the matrix arrangement of the pixels in the pixel array 10 has output signal lines 33 and 43 alternately wired to the columns as well as the first control signal line and the second control signal line wired to the row of the first pixels 31 and the row of the second pixels 41, respectively. These control signal lines include the transfer control line 112, the reset control line 113 and the selection control line 114. Furthermore, the reset line 115 that supplies the reset voltage is wired to each of the pixels (the first pixels 31 and the second pixels 41). Although the shape of the first pixels 31 and the second pixels 41 is octagonal by way of example, these pixels may be of a hexagonal shape or other polygonal shapes.

The MOS image sensor 53 has a configuration similar to that of the MOS image sensor 52 described with reference to FIG. 3 except in that, for example, the shape of the pixel is changed from square to octagonal; the first control signal line and the second control signal line are disposed such that they detour around the first pixels 31 and second pixels 41; and the first output signal lines 33 and the second output signal lines 43 are disposed.

Another embodiment (fourth example) of the invention will be described below with reference to the layout diagram shown in FIG. 6.

Figure 6:
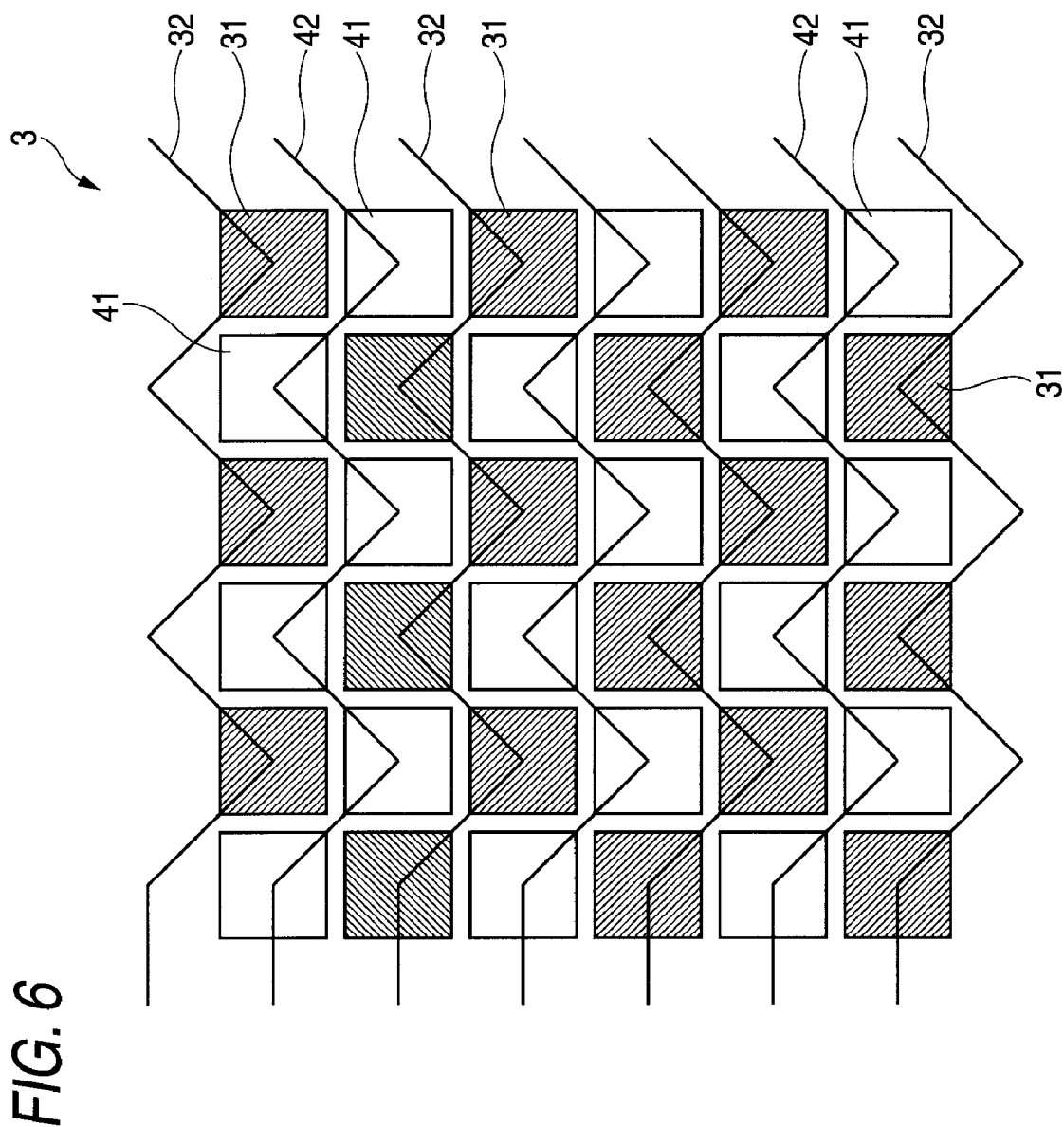
FIG. 6 is a layout diagram showing another embodiment (fourth example) of the invention.

As shown in FIG. 6, the solid-state imaging device 3 of the fourth example has the first pixels (low-sensitivity pixels) 31 and the second pixels (high-sensitivity pixels) 41 having higher sensitivity than the first pixels 31 arranged in a checker board pattern, and the first pixels 31 and the second pixels 41 are disposed evenly spaced apart. The first control signal line 32 that controls the first pixels 31 and the second control signal line 42 that controls the second pixels 41 are wired independent of each other. Although the first and second control signal lines 32 and 42 are drawn by zigzag lines since the figure is diagrammatically drawn, the control signal lines, in practice, are wired such that they detour around photosensors of the pixels, for example, using the surrounding areas of the pixels. Moreover, although not shown in the figure, the output signal line for the first pixels 31 and the output signal line for the second pixels 41 are wired independent of each other.

In the solid-state imaging device 3 having the above configuration, the low-sensitivity first pixels 31 and the high-sensitivity second pixels 41 arranged in the checker board pattern further improves the image quality compared to that of the solid-state imaging device 1 of the first example.

As shown in the solid-state imaging devices 1, 2 and 3, by employing the pixel arrangements (see FIGS. 1, 4 and 6) that allow independent drive of the first pixels 31 and the second pixels 41 having higher sensitivity than the first pixels 31, the first control signal line 32 that controls the first pixels 31 and the second control signal line 42 that controls the second pixels 41 are easily wired to the respective rows in the pixel arrangement independent of each other, allowing simultaneous application of different types of exposure time and readout timing to the first pixels 31 and the second pixels 41. Application of different types of exposure time and readout timing can provides longer exposure time to the first pixels 31 to obtain sufficient signals and shorter exposure time to the second pixels 41 to prevent saturation.

Although the first pixels 31 and the second pixels 41 are two-dimensionally arranged in the solid-state imaging devices described above, the invention can be applied to a structure in which the photodiodes of the first pixels 31 are disposed in the layer that underlies the photodiodes of the second pixels 41 via a separation area. In this configuration, part of the photodiode of each of the first pixels 31 may be extended onto the semiconductor substrate, and the extended portion is connected to the first control signal line 32.

Another embodiment (fifth example) of the invention will be described below with reference to the schematic configuration cross-sectional view shown in FIG. 7.

Figure 7:
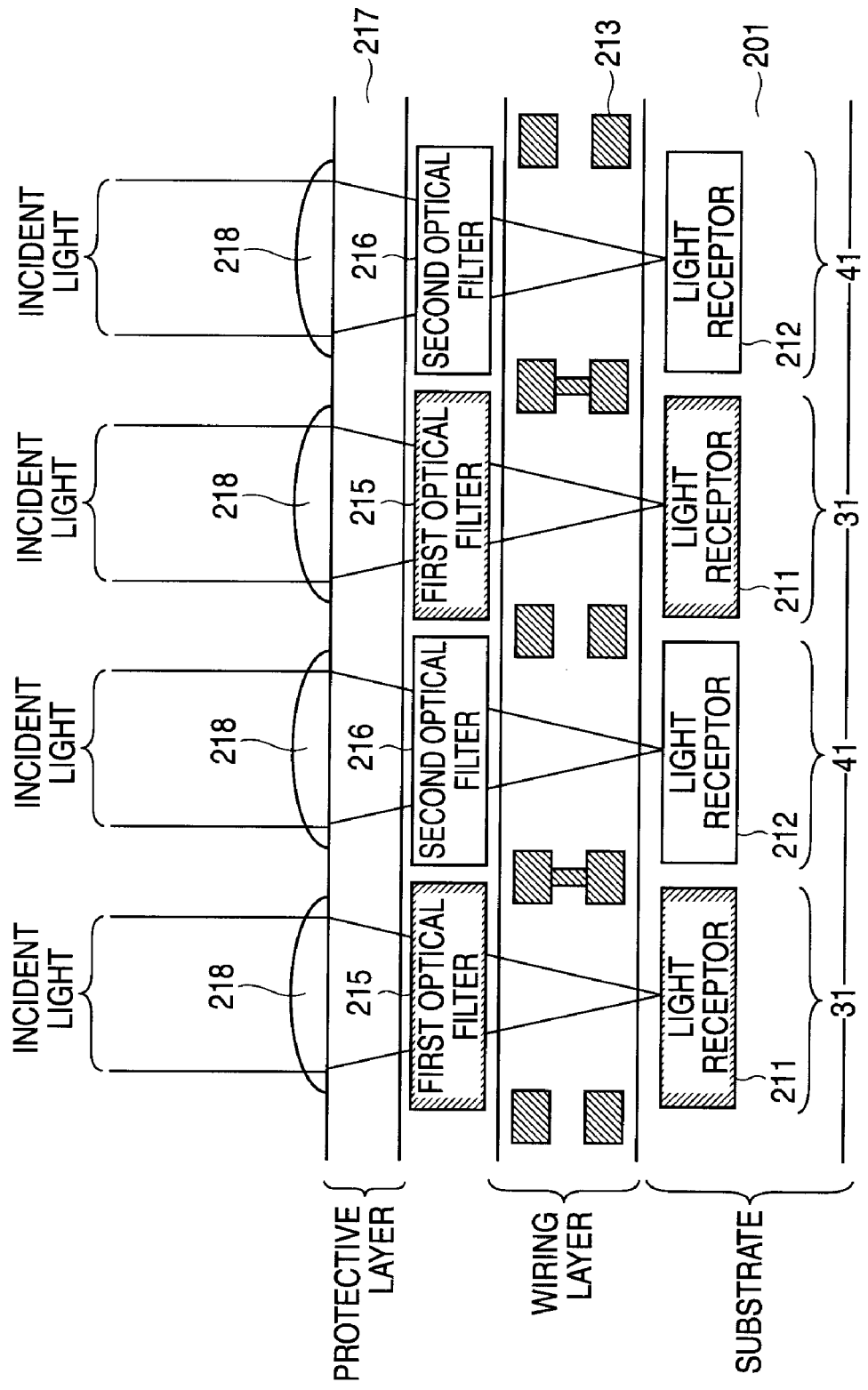
FIG. 7 is a schematic configuration cross-sectional view showing another embodiment (fifth example) of the invention.

As shown in FIG. 7, light receptors 211 of the plurality of first pixels 31 and light receptors 212 of the plurality of second pixels 41 in any of the pixel arrangements, for example, described with reference to FIGS. 1, 4 and 6 are formed on a substrate (for example, a semiconductor substrate or a substrate on which a semiconductor layer is formed) 201. Wiring lines 213 are formed in the area on the substrate 201 that does not correspond to the pixel areas. First optical filters 215 are formed over the first pixels 31 via a wiring layer 214 where the wiring lines 213 are formed. Second optical filters 216, each having a spectral characteristic different from that of the first optical filter 215, are formed over the second pixels 41 via the wiring layer 214. A protective layer 217 is formed to cover the first optical filters 215 and the second optical filters 216, and on-chip lenses 218 are formed on the protective layer 217.

For example, optical filters that block infrared light having wavelengths of 700 nm and higher are integrated with the first pixels 31, which are low-sensitivity pixels, while optical filters that transmit light having wavelengths from 700 nm to 1000 nm are integrated with the second pixels 41, which are high-sensitivity pixels, so that the amount of incident light to the high-sensitivity pixels increases, allowing higher sensitivity.

As shown in the fifth example, by using the first optical filter 215 and the second optical filter 216 having spectral characteristics different from each other, the high-sensitivity second pixels 41 can be mixed to obtain higher S/N ratio signals.

Another embodiment (sixth example) of the invention will be described with reference to a schematic configuration cross-sectional view shown in FIG. 8.

Figure 8:
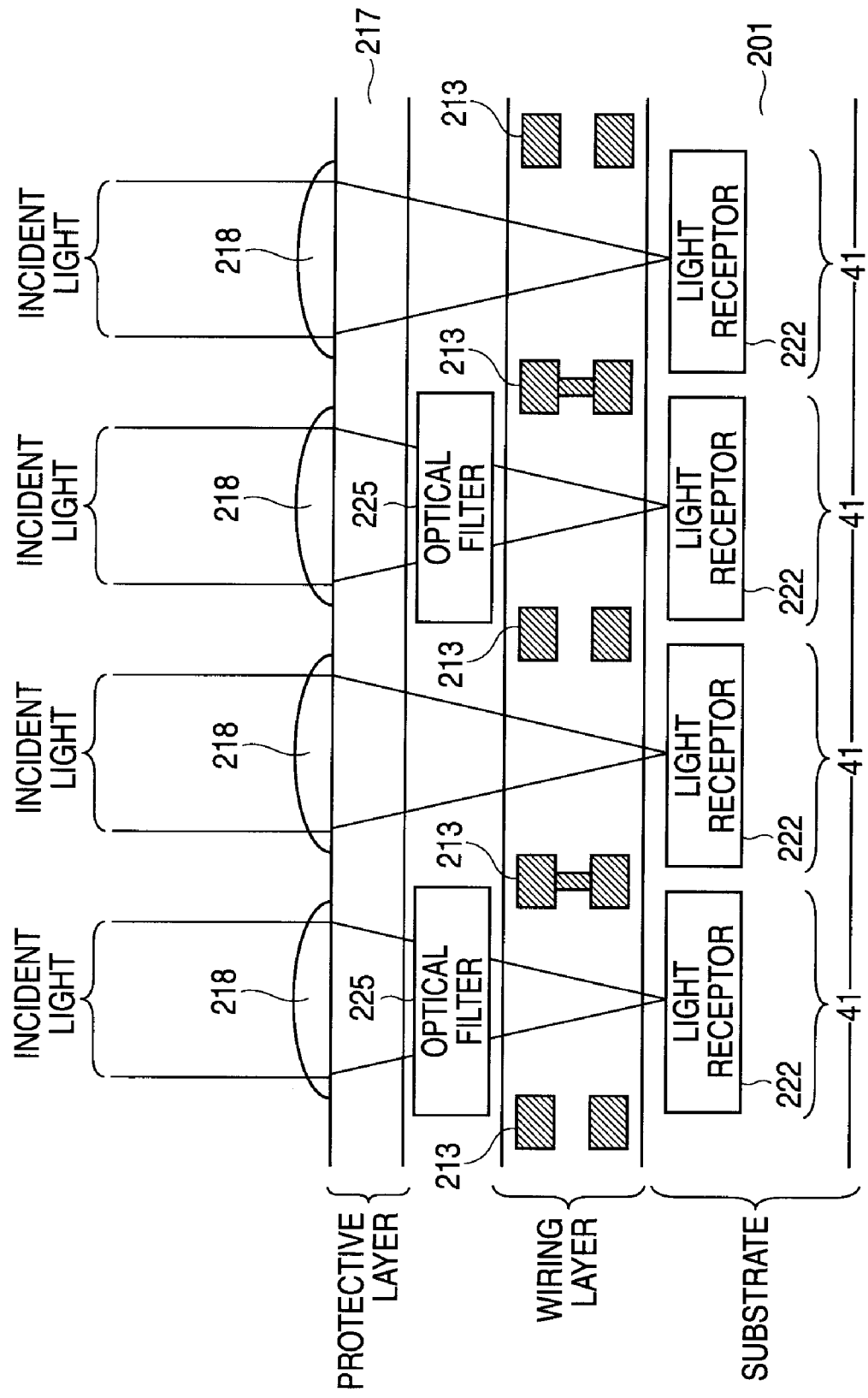
FIG. 8 is a schematic configuration cross-sectional view showing another embodiment (sixth example) of the invention.

As shown in FIG. 8, light receptors (not shown) of the plurality of first pixels and light receptors 222 of the plurality of second pixels 41 in any of the pixel arrangements, for example, described with reference to FIGS. 1 and 4 are formed on a substrate (for example, a semiconductor substrate or a substrate on which a semiconductor layer is formed) 201. The wiring lines 213 are formed in the area on the substrate 201 that does not correspond to the pixel areas. Optical filters 225 are formed over the first pixels 31 via the wiring layer 214 where the wiring lines 213 are formed. On the other hand, no optical filter is formed over some of the second pixels 41. The protective layer 217 is formed to cover the optical filters 225, and on-chip lenses 218 are formed on the protective layer 218 corresponding to the pixels. Thus, forming no optical filter 225 on some of the high-sensitivity second pixels 41 increases the amount of incident light to the light receptors 222, allowing corresponding pixels to have higher sensitivity.

Another embodiment (seventh example) of the invention will be described with reference to the layout diagram shown in FIG. 9.

Figure 9:
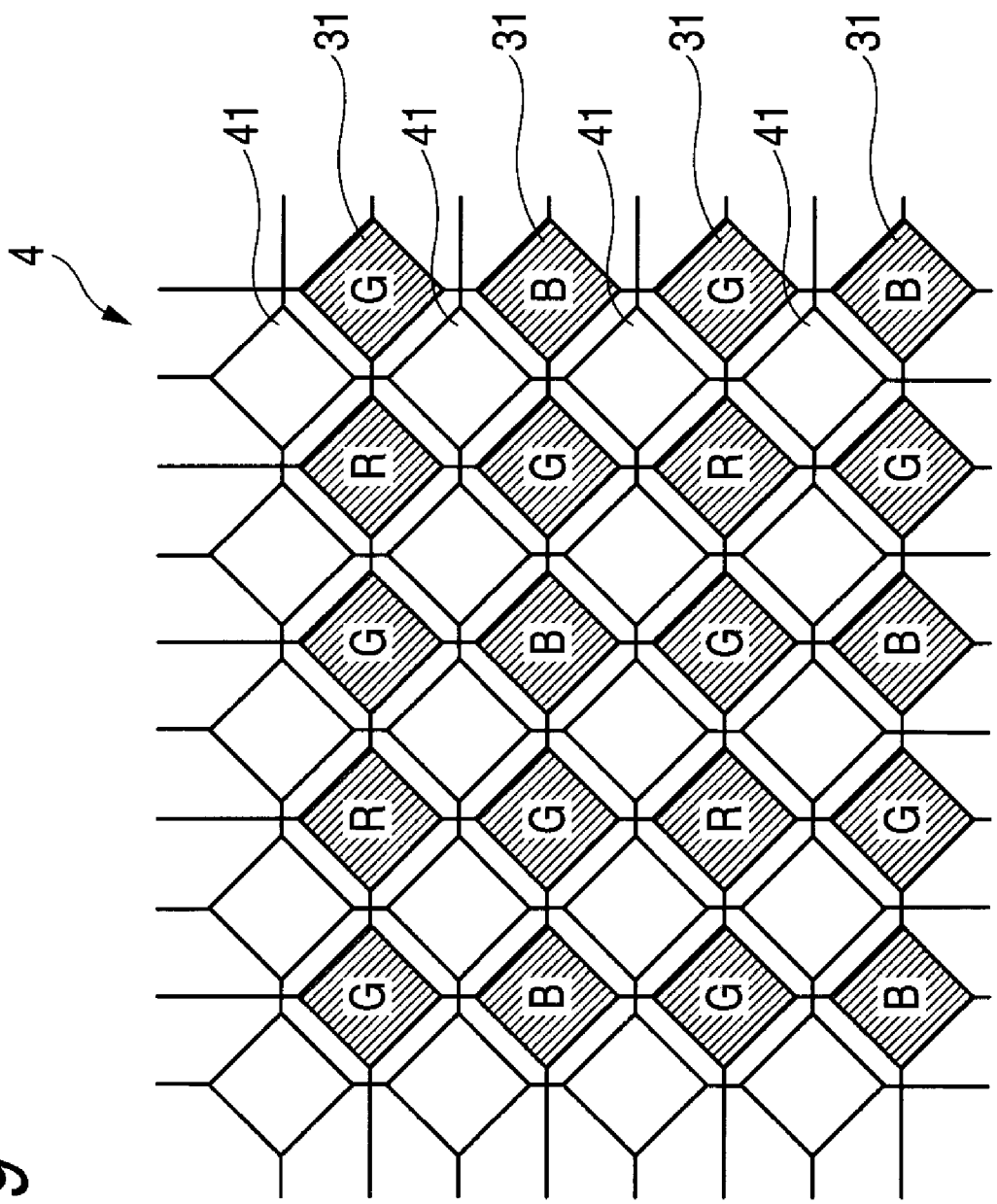
FIG. 9 is a layout diagram showing another embodiment (seventh example) of the invention.

As shown in FIG. 9, the plurality of first pixels 31 and the plurality of second pixels 41 having higher sensitivity than the first pixels 31 are formed in the pixel arrangement described, for example, in FIG. 4A or 4B. Optical filters (not shown) are formed over the first pixels 31. Each of the optical filters is a color filter having one of the three primary colors of light and complementary colors thereof. On the other hand, no color filter is formed over the second pixels 41. Each of the optical filters is, for example, a color filter that transmits one of the three primary RGB colors of light and complementary colors thereof. By way of example, the color filters are arranged in the order of GBGB and RGRG in the column direction, and these arrangements are alternately disposed in the row direction.

The optical filters (color filters), each transmitting one of the three primary RGB colors, are thus arbitrarily disposed over the first pixels 31, which are low-sensitivity pixels, so that the first pixels can be used to acquire color images.

The exemplary pixel layout of the solid-state imaging device 4 shown in FIG. 9 is an example in which the primary three RGB colors are disposed over the first pixels 31, which are low-sensitivity pixels. In this configuration, the number of green (G), to which the eyes are sensitive among the color transmissive filters, is greater than the number of other colors. In this example, the second pixels 41, which are high sensitivity pixels and have no color transmissive filter, have the highest resolution and an excellent S/N ratio, so that they can be utilized for signal processing, such as enhancement of edges in an image.

In this example, although the description has been made of the three primary color RGB optical filters typically used in digital cameras, any other filters, such as filters having the complementary colors of the three primary colors, may be used as far as they have spectral characteristics that can be used to generate color images.

By disposing filters having three primary RGB colors or the complementary colors thereof over the low-sensitivity first pixels 31, color images can be acquired independent of the high sensitivity pixels. The high sensitivity pixels can be used for signal processing (image edge enhancement, for example) of color images obtained by the low sensitivity pixels.

Figure 10:
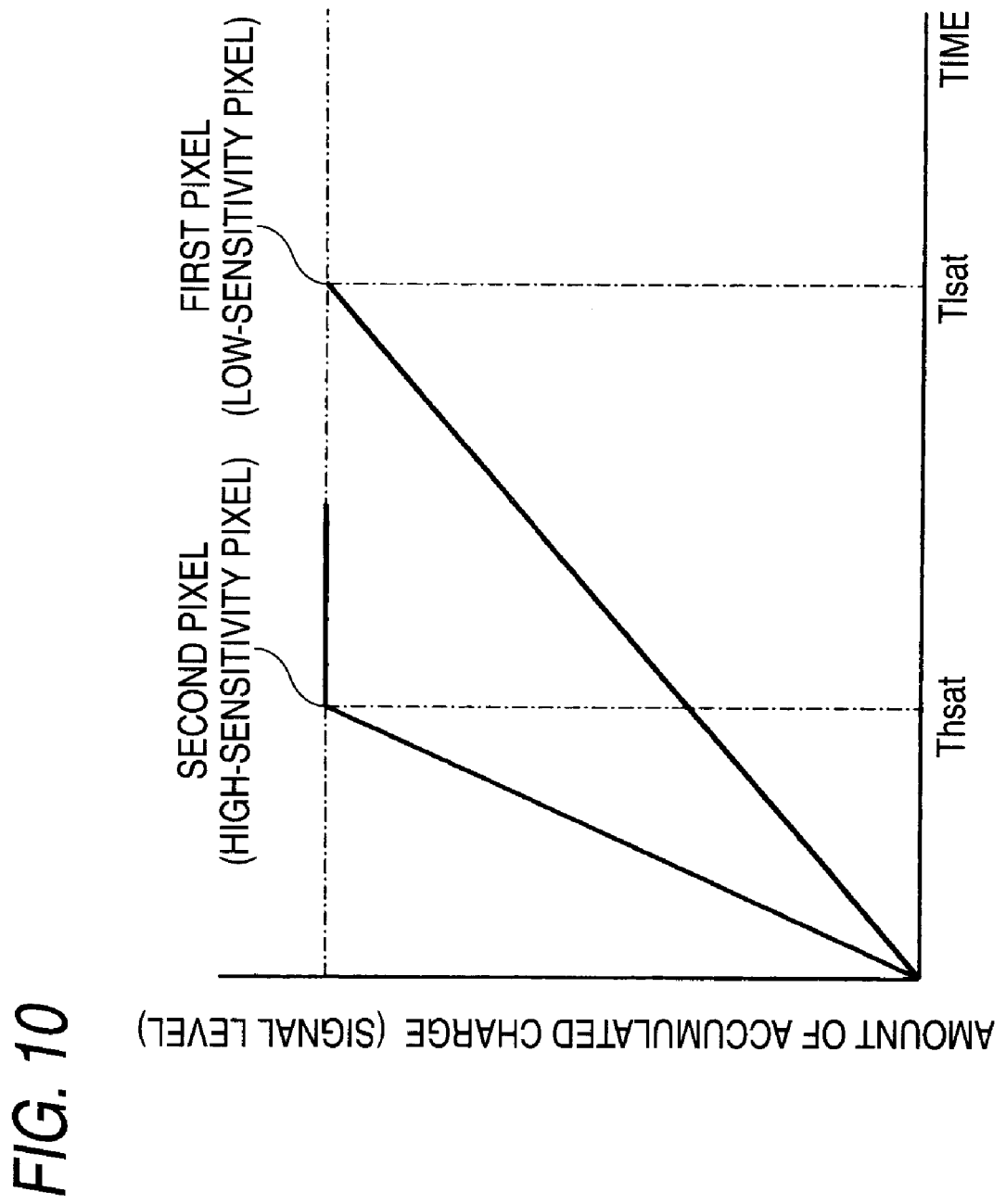
FIG. 10 shows the relationship between the amount of accumulated charge (signal level) and the exposure time in another embodiment (eighth example) of the invention.

Another embodiment (eighth example) of the invention will be described below with reference to FIG. 10. In the following description, components similar to those used in the previous description have the same reference characters. In FIG. 10, the vertical axis represents the amount of accumulated charge (signal level) and the horizontal axis represents the exposure time.

The solid-state imaging device of the eighth example is configured such that in the solid-state imaging devices described, for example, in the first to seventh examples, exposure time for the high-sensitivity second pixels 41 and the low-sensitivity first pixels 31 are controlled independent of each other.

For example, as shown in FIG. 10, since the light receptors of the high-sensitivity second pixels 41 receive more incident light, or have greater photoelectric conversion efficiency, the rate of change in the amount of accumulated charge (output signal level) with time is greater than that of the low-sensitivity first pixels 31. When the second pixels 41 reach the saturation level, the amount of accumulated charge (output signal level) is saturated, which prevents further signal acquisition. Setting exposure time shorter than Thsat at which the second pixels 41 are saturated can prevent the saturation of the second pixels 41.

On the other hand, since the first pixels 31 have a smaller rate of change, setting exposure time shorter than Thsat, as in the second pixels 41, will reduce the output signal level and hence significantly degrade the S/N ratio. Therefore, the exposure time set for the first pixels 31 is preferably shorter than or equal to Tlsat but longer than the exposure time for the high sensitivity pixels.

By controlling the exposure time for the low-sensitivity first pixels 31 and the high-sensitivity second pixels independent of each other, correct exposure can be applied to both the first pixels 31 and the second pixel 41, allowing the first pixels 31 to acquire sufficient signal charge, while preventing the saturation of the second pixels 41.

Figure 11:
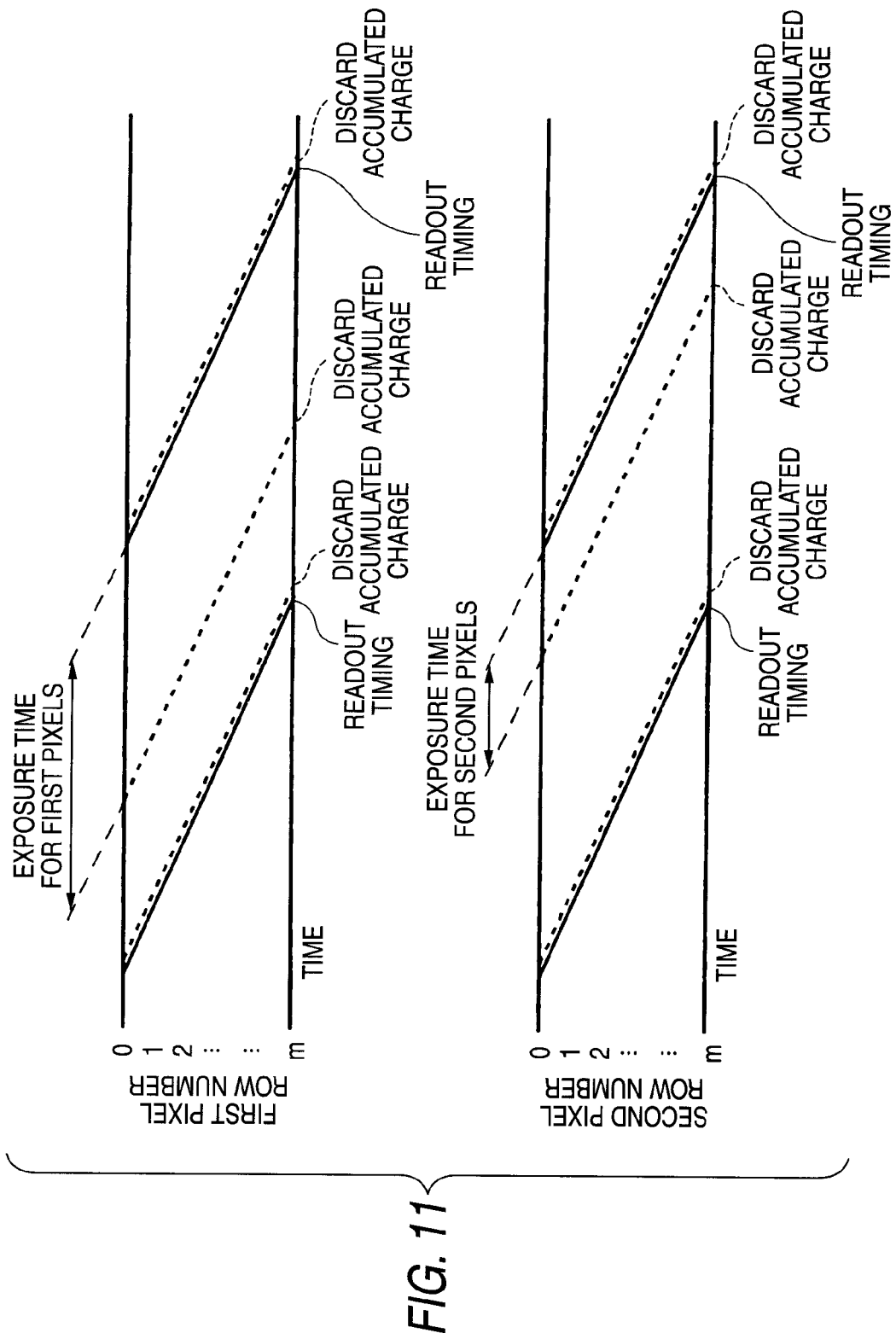
FIG. 11 is a timing chart showing another embodiment (ninth example) of the invention.

Another embodiment (ninth example) of the invention will be described below with reference to FIG. 11. In the following description, components similar to those used in the previous description have the same reference characters. In FIG. 11, the vertical axis represents the pixel row number and the horizontal axis represents time.

The solid-state imaging device of the ninth example is configured such that in the solid-state imaging devices, for example, described in the first to eighth examples, letting a row unit be the pixels arranged in the horizontal direction, the electrons accumulated in the pixels in the unit row are discarded and then the exposure is initiated.

For example, FIG. 11 shows an example of the operation in which the charge discard timing is controlled for each row, as well as an example of timing in which the exposure time for the high-sensitivity second pixels 41 is controlled independent of the exposure time for the low-sensitivity first pixels 31. When the low-sensitivity pixels and the high-sensitivity pixels are accessed and read out for each row, the charge discard timing and the readout timing are different for each row. By discarding the accumulated charge and then initiating the exposure for each row, the exposure time for the low-sensitivity pixels can be set independent of the exposure time for the high-sensitivity pixels, and the exposure time can be the same for each row of the same sensitivity.

In the solid-state imaging device of the ninth example, even when the readout timing is different for each row, the exposure time can be arbitrarily set by discarding the accumulated electrons and then initiating the exposure on a row basis.

Another embodiment (tenth example) of the invention will be described below with reference to FIGS. 12A and 12B. In the following description, components similar to those used in the previous description have the same reference characters. FIG. 12A shows an exemplary configuration of the pixel circuit and FIG. 12B shows the control signals of the selection pulse SEL, the reset pulse RST and the transfer pulse TRG at the readout timing and the charge discard timing.

The sold-state imaging device of the tenth example is applied to the sold-state imaging devices described, for example, in the first to ninth examples. In the sold-state imaging device of the tenth example, the operation in which the accumulated electrons are discarded and then the exposure is initiated is controlled at independent timings for the arrangements of the first pixels 31 and the second pixels 41.

For example, FIG. 12A shows an exemplary configuration of the pixel circuit and FIG. 12B shows the control signals of the selection pulse SEL, the reset pulse RST and the transfer pulse TRG at the readout timing and the charge discard timing. The pixel circuit shown in FIG. 12A has a pixel circuit configuration substantially similar to that described in the first example and includes the photoelectric conversion element, such as the photodiode 21, as well as four transistors, for example, the transfer transistor 22, the reset transistor 23, the amplification transistor 24 and the selection transistor 25. In the circuit configurations of the sold-state imaging devices, a three-transistor configuration in which the selection transistor 25 is omitted or in a configuration in which the amplification transistor 24 is shared by a plurality of pixels can also discard the charge at an arbitrary timing.

In the sold-state imaging device of the tenth example, even when the readout timing is different for each row, the exposure time can be arbitrarily set for the low-sensitivity first pixels 31 and the high-sensitivity second pixels 41 independent of each other.

Figure 13:
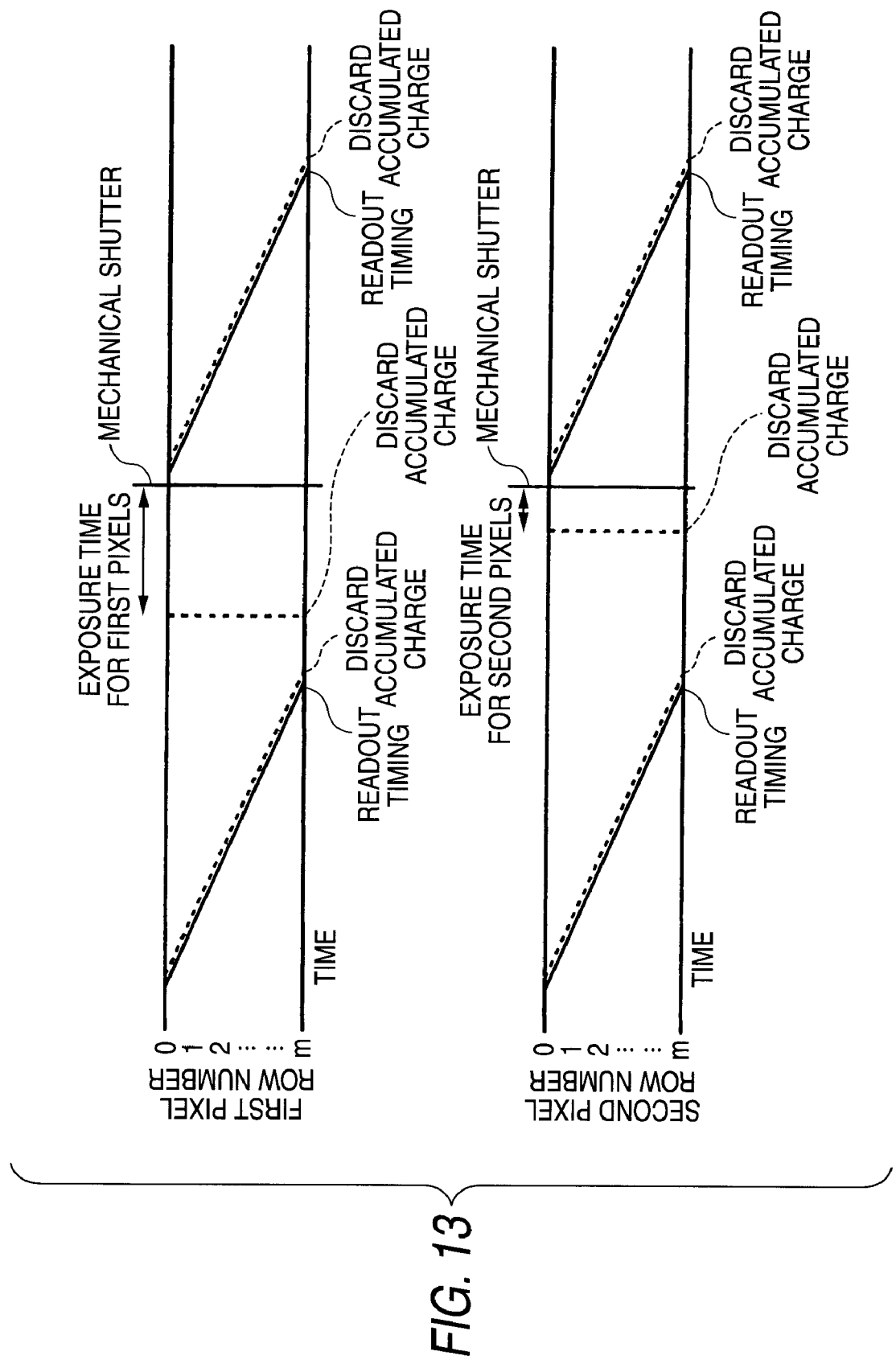
FIG. 13 is a timing chart showing another embodiment (eleventh example) of the invention.

Another embodiment (eleventh example) of the invention will be described below with reference to FIG. 13. In the following description, components similar to those used in the previous description have the same reference characters. FIG. 13 shows an example of the operation in which the charge is simultaneously discarded from a plurality of rows. In FIG. 13, the vertical axis represents the pixel row number and the horizontal axis represents time.

The solid-state imaging device of the eleventh example is configured such that in the solid-state imaging devices described, for example, in the ninth and tenth examples, the operation in which the accumulated electrons are discarded and then the exposure is initiated is simultaneously controlled for the plurality of rows.

As shown in FIG. 13, the accumulated charge is discarded and the exposure is initiated simultaneously in all low-sensitivity pixel rows and high-sensitivity pixel rows. In this way, the timing when the exposure period is initiated can be the same for a plurality of rows. FIG. 13 shows an example in which a mechanical shutter is used to achieve the same exposure period termination timing. The termination of the exposure period can also be carried out by electric transfer and retention of the accumulated charge.

As shown in the sold-state imaging device of the eleventh example, even when a plurality of rows have the same exposure termination timing or readout timing, arbitrary exposure time can be set by discarding the accumulated electron and then initiating the exposure simultaneously for the plurality of rows. Thus, even in a global shutter operation, the exposure time for the low-sensitivity first pixels 31 can be set independent of the exposure time for the high-sensitivity second pixels 41.

Another embodiment (twelfth example) of the invention will be described below with reference to FIGS. 11 and 13. In the following description, components similar to those used in the previous description have the same reference characters.

The solid-state imaging device of the twelfth example is configured such that in the solid-state imaging devices described, for example, in the eighth to eleventh examples, the electrons accumulated in the second pixels 41 are discarded at a timing later than the first pixels 31 and then the exposure is initiated.

As shown in FIGS. 11 and 13, by performing the charge discard operation for the high-sensitivity pixels at a timing later than the charge discard operation for the low-sensitivity pixels (the exposure period termination timing is the same for the high-sensitivity and the low-sensitivity pixels), the exposure time for the high-sensitivity pixels can be shortened.

According to the sold-state imaging device of the twelfth example, setting shorter exposure time for the second pixels 41 than that for the first pixels 31 provides an advantage of allowing the low-sensitivity first pixels 31 to acquire sufficient signal charge, while preventing the saturation of the high-sensitivity second pixel 41.

Figure 14:
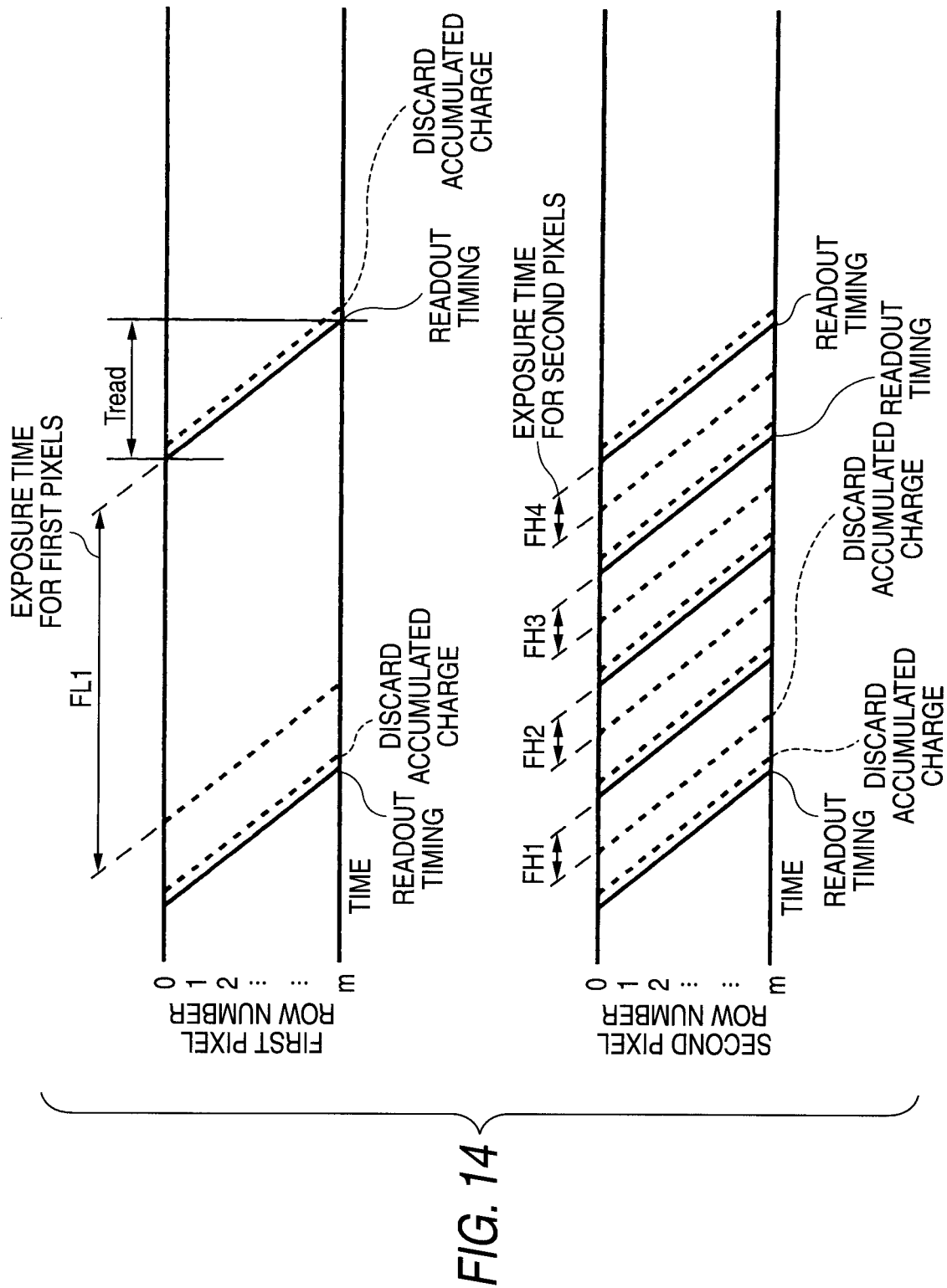
FIG. 14 is a timing chart showing another embodiment (thirteenth example) of the invention.
Figure 15:
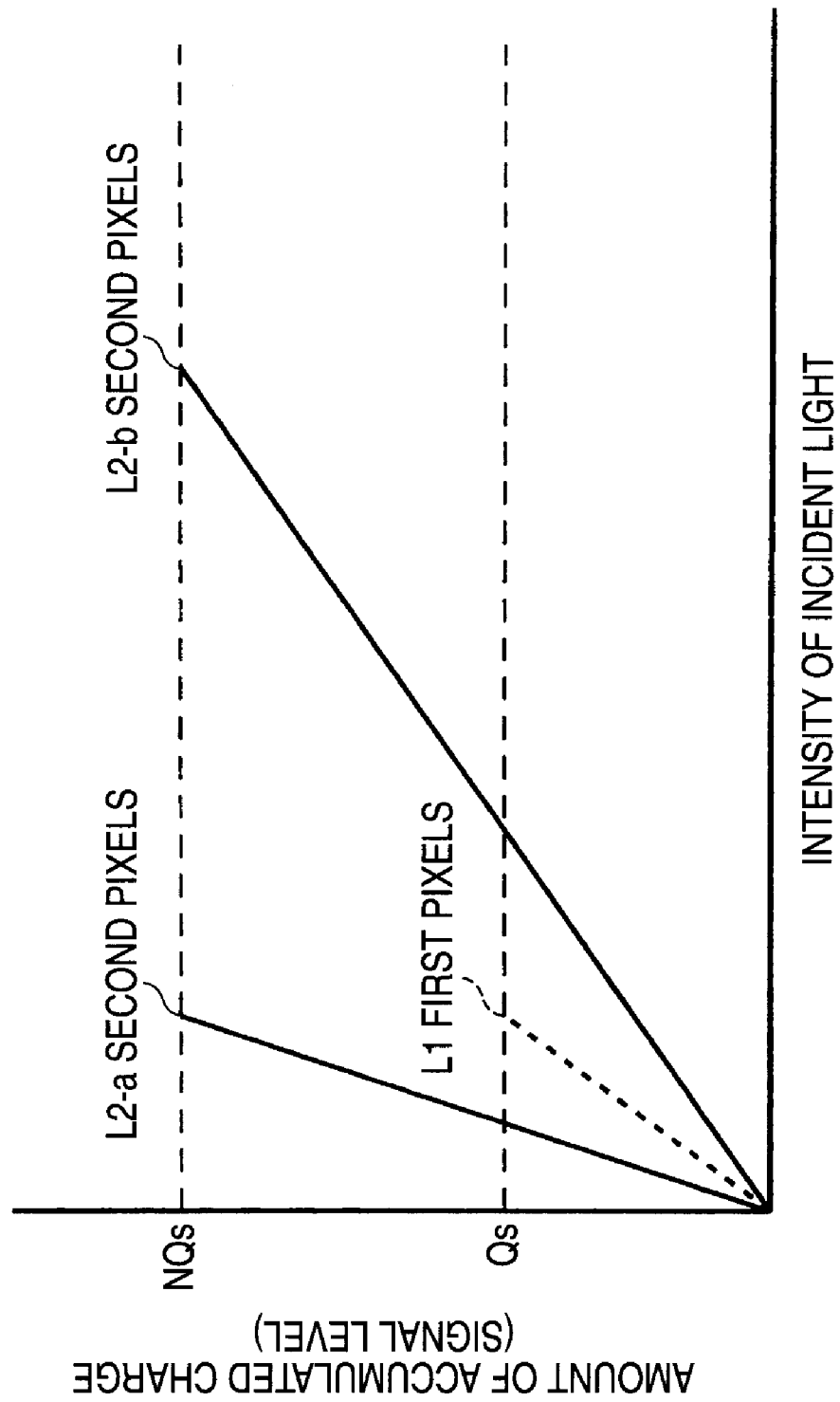
FIG. 15 shows the relationship between the amount of accumulated charge (signal level) and the intensity of incident light in another embodiment (thirteenth example) of the invention.

Another embodiment (thirteenth example) of the invention will be described below with reference to FIGS. 14 and 15. In the following description, components similar to those used in the previous description have the same reference characters. FIG. 14 shows an example of timing in which the high-sensitivity second pixels 41 are operated at a frame rate higher than that for the low-sensitivity first pixels 31. In FIG. 14, the vertical axis represents the pixel row number and the horizontal axis represents time. FIG. 15 shows an example in which a plurality of high-speed frames are integrated to increase the dynamic range. In FIG. 15, the vertical axis represents the amount of accumulated charge (signal level) and the horizontal axis represents the intensity of incident light.

The solid-state imaging device of the thirteenth example is configured such that in the solid-state imaging devices described, for example, in the first to twelfth examples, the readout rate of the high-sensitivity second pixels 41 is higher than the readout rate of the low-sensitivity first pixels 31. In other words, the signal values of the first pixels 31 are read out once, while the signal values of the second pixels 41 are read out multiple times at high speed and summed.

As shown in FIG. 14, in this example, the second pixels 41 are driven at a frame rate four times higher than that of the first pixels 31. By summing the frames read out from the second pixels 41 during one frame period of the first pixel 31, that is, summing the four frames FH1 to FH4 from the second pixels 41 as shown in FIG. 14, the relationship of the signal level with the intensity of incident light is obtained as shown in FIG. 15.

In FIG. 15, the line L1 indicative of the first pixel, which is the low-sensitivity pixel, shows the relationship of the signal level of the first pixel 31 with the intensity of incident light, and it is seen that the signal level increases in proportional to the intensity of incident light. The signal level is saturated when it reaches the saturation level Qs, and the intensity of incident light greater than the saturation level may not be handled.

On the other hand, in FIG. 15, the line L2-$a$ indicative of the second pixel 41, which is the high-sensitivity pixel, shows the relationship of the signal level of the second pixel 41 with the intensity of incident light, and it is seen that summing N frames allows the signal up to NQs to be handled since the saturation level per frame is Qs. Furthermore, by delaying the charge discard timing to shorten the exposure time for each frame, as shown by the line L2-$b$ indicative of the high-sensitivity second pixel 41 in FIG. 15, the sensitivity can be equivalently reduced (the amount of incident light during the exposure period can be reduced) to increase the intensity of incident light to be handled. Letting Ta be the exposure time and Tb be the exposure time, the rate of change is Tb/Ta.

According to the sold-state imaging device of the thirteenth example, reducing the exposure time for the high-sensitivity second pixels 41 provides an advantage of allowing the low-sensitivity first pixels 31 to acquire sufficient signal charge, while preventing the saturation of the second pixels 41. Furthermore, summing a plurality of frames of the second pixels 41 acquired at high speed provides an advantage of averaged and reduced random noise, resulting in a higher S/N ratio. Moreover, since the exposure period of the first pixels agrees with the exposure periods of the plurality of frames of the second pixels 41 (there is no discrepancy between the exposure periods for the first pixels 31 and the second pixels 41), there is provided an advantage of reduced discrepancy and misalignment of the exposure time for the first pixels 31 and the second pixels 41 when a moving subject is imaged.

Figure 16:
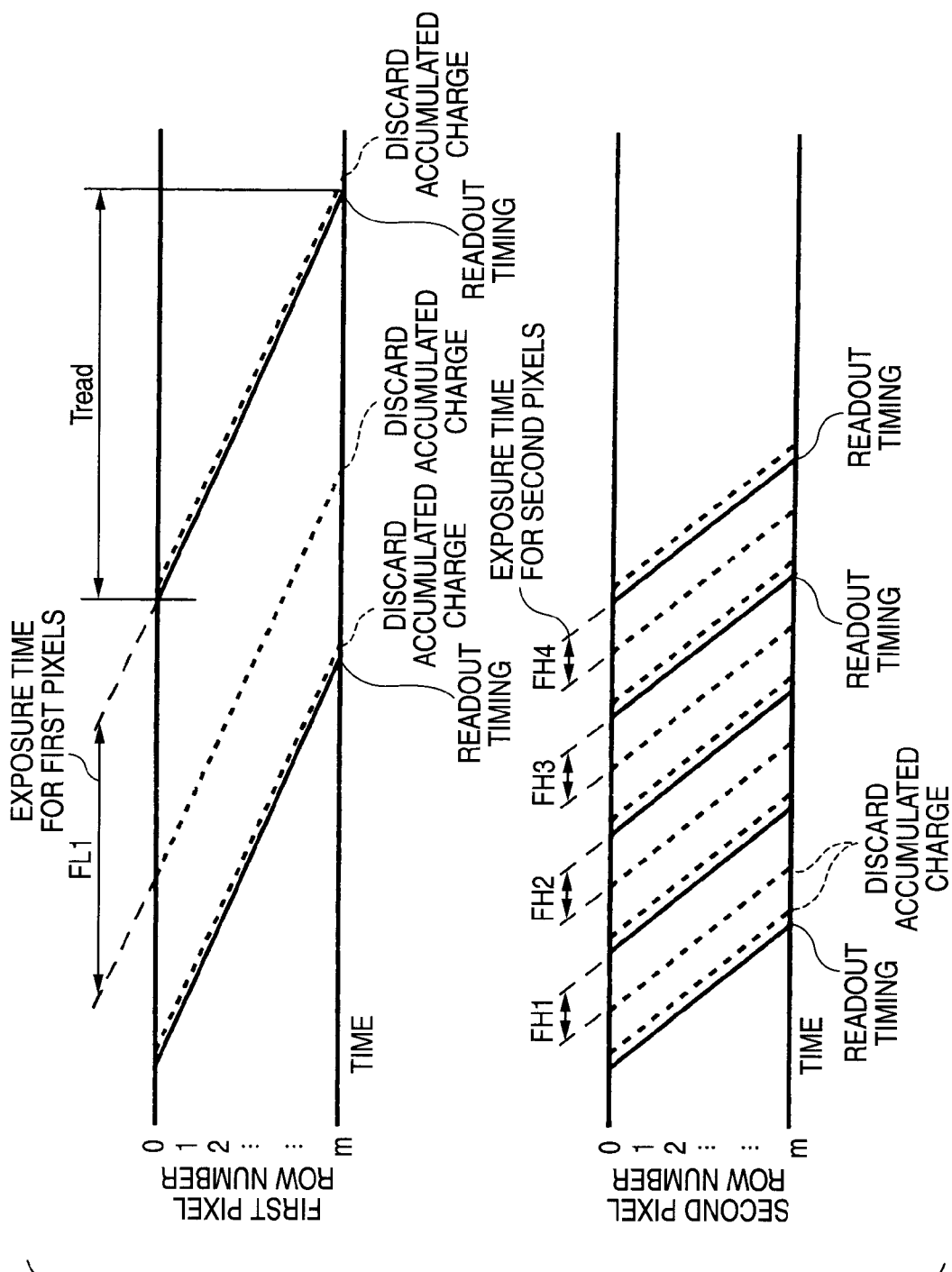
FIG. 16 is a timing chart showing another embodiment (fourteenth example) of the invention.

Another embodiment (fourteenth example) of the invention will be described below with reference to FIG. 16. In the following description, components similar to those used in the previous description have the same reference characters. FIG. 16 shows an example of the operation in which the readout scan of the low-sensitivity first pixels 31 overlaps a plurality of frames of the high-sensitivity second pixels 41. In FIG. 16, the vertical axis represents the pixel row number and the horizontal axis represents time.

The solid-state imaging device of the fourteenth example is configured such that in the solid-state imaging device described in the thirteenth example, the vertical scan period of the low-sensitivity first pixels 31 overlaps a plurality of vertical scan periods of the high-sensitivity second pixels 41.

FIG. 16 shows the operation in which the vertical scan period of the low-sensitivity first pixels 31 overlaps a plurality of vertical scan periods of the high-sensitivity second pixels 41. In this exemplary operation, as in FIG. 14, the second pixels 41 are driven at a frame rate four times higher than that of the first pixels 31. By employing the operation shown in FIG. 16, although the frame rate is the same as that in the drive operation in FIG. 14, the readout period Tread for the first pixels 31 is increased, allowing longer Tread/m, which is a period of time for reading out one row.

Tread is the period for reading out one frame. When m rows are accessed during one frame, it is necessary to read out one row in Tread/m. By summing N frames, the signal level Qsig becomes N×Qsig, while the root mean square value of random noise Qnoise becomes $\sqrt{(N \times Qnoise^2)}$. Accordingly, there is provided an advantage of increasing the S/N ratio multiplied by $N/\sqrt{(N)}$ and hence reducing random noise.

According to the sold-state imaging device of the fourteenth example, since the readout period per row of the low-sensitivity first pixels 31 is longer than that of the high-sensitivity second pixels 41, there is provided an advantage of ensuring a longer time for A-to-D conversion and signal processing. Thus, more accurate A-to-D conversion and complex signal processing can be applied to low-sensitivity pixels having a poorer S/N ratio (compared to the second pixel 41), which contributes to high image quality.

Figure 17:
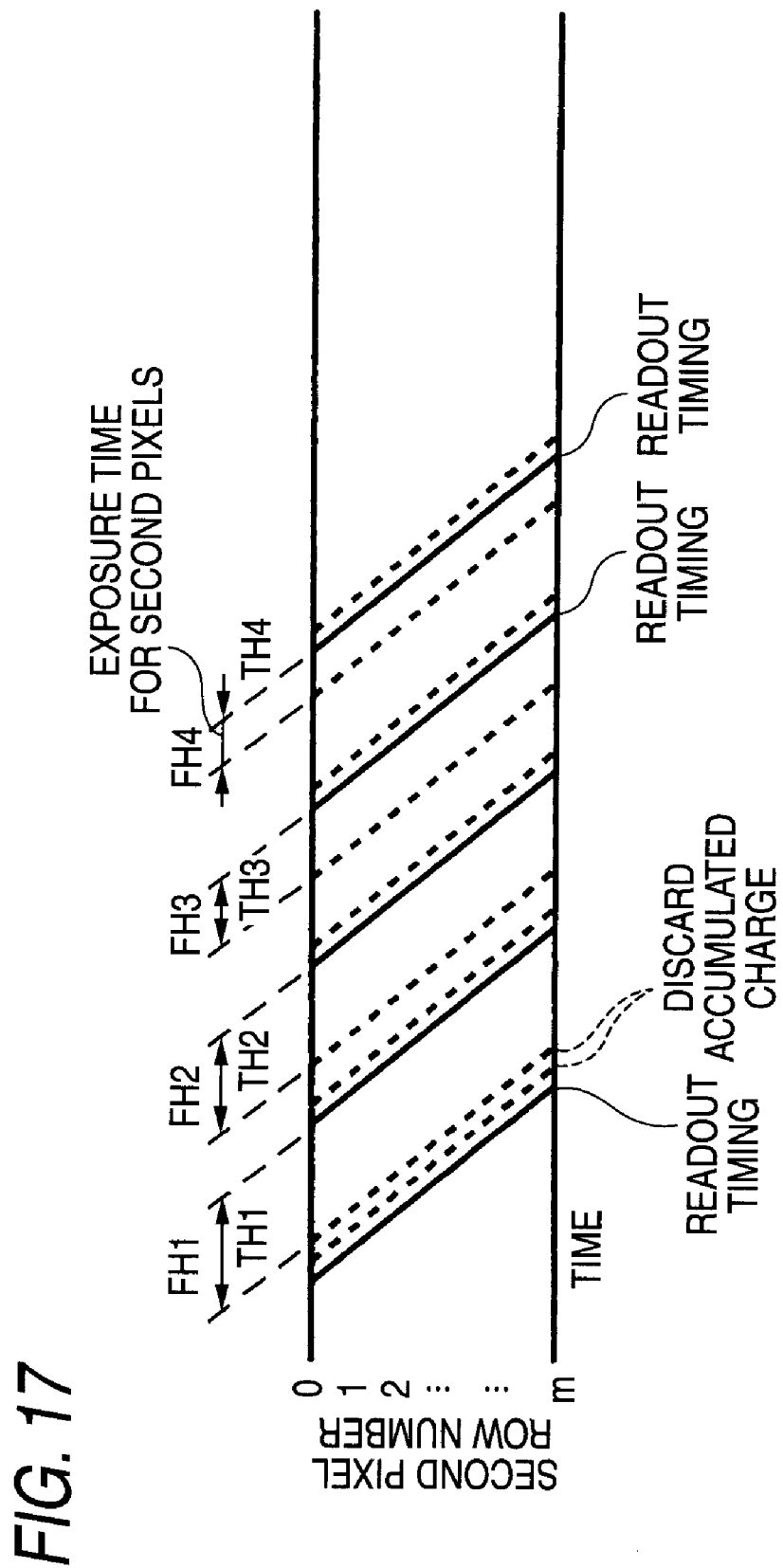
FIG. 17 is a timing chart showing another embodiment (fifteenth example) of the invention.
Figure 18:
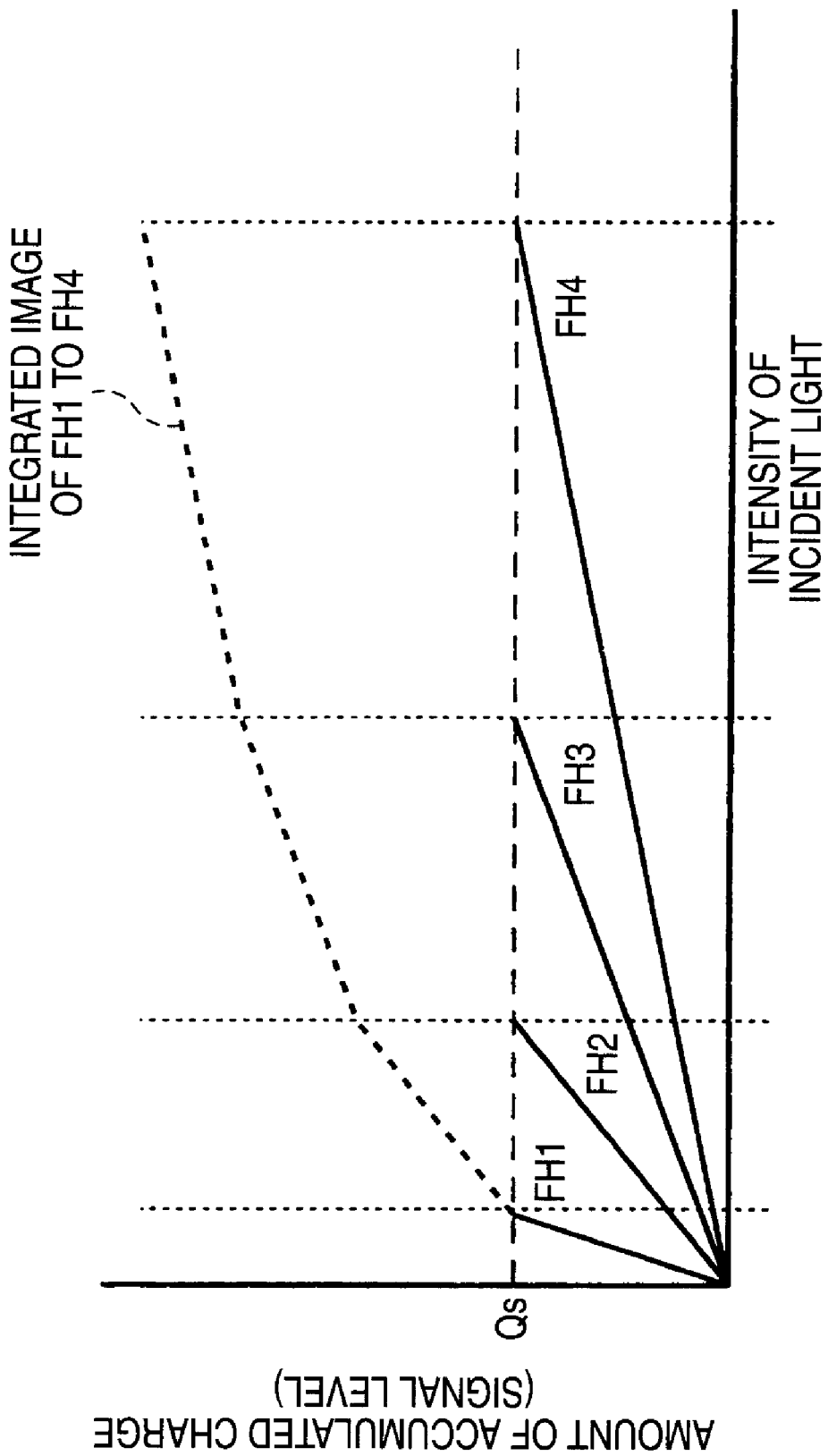
FIG. 18 shows the relationship between the amount of accumulated charge (signal level) and the intensity of incident light in another embodiment (fifteenth example) of the invention.

Another embodiment (fifteenth example) of the invention will be described below with reference to FIGS. 17 and 18. In the following description, components similar to those used in the previous description have the same reference characters. FIG. 17 shows an example in which multiple types of exposure time is applied. In FIG. 17, the vertical axis represents the pixel row number and the horizontal axis represents time. FIG. 18 shows the characteristic of the integrated image when multiple types of exposure time is used. In FIG. 18, the vertical axis represents the amount of accumulated charge (signal level) and the horizontal axis represents the intensity of incident light.

The solid-state imaging device of the fifteenth example is configured such that in the solid-state imaging device described in the fourteenth example, two or more types of exposure time are set for the plurality of vertical scan periods of the second pixels 41, which are high-sensitivity pixels.

As shown in FIG. 17, different types of exposure time are set for the plurality of frames of the high-sensitivity second pixels 41. Letting TH1 to TH4 be the exposure time of the frames FH1 to FH4, reducing the exposure time can reduce the amount of incident light in the exposure period and hence increase the intensity of incident light to be handled. That is, the rate of change in the amount of accumulated charge versus the intensity of incident light can be reduced.

FIG. 18 shows the relationship between the intensity of incident light and the amount of accumulated charge of the frames FH1 to FH4 when the exposure time satisfies, for example, the following equation: TH1>TH2>TH3>TH4. The intensity of incident light to be handled is largest in the frame FH4, while the sensitivity is highest in the frame FH1. The broken line in FIG. 18 shows integrated signals of FH1 to FH4. Thus, the operation can be carried out by using higher sensitivity in the area where the intensity of incident light is small, while reducing the amount of incident light in the area where the intensity of incident light is large so as to prevent the saturation.

According to the sold-state imaging device of the fifteenth example, by applying two or more types of exposure time to the plurality of frames of the second pixels 41, which are high-sensitivity pixels, a plurality of images, each having different relationship between the sensitivity and the amount of saturation can be obtained. Since there is a tradeoff relationship between the sensitivity and the amount of saturation depending on the length of the exposure time, integrating two or more images obtained in the sensitivity priority mode and in the saturation amount priority mode can achieve both high sensitivity and a wide dynamic range.

Figure 19:
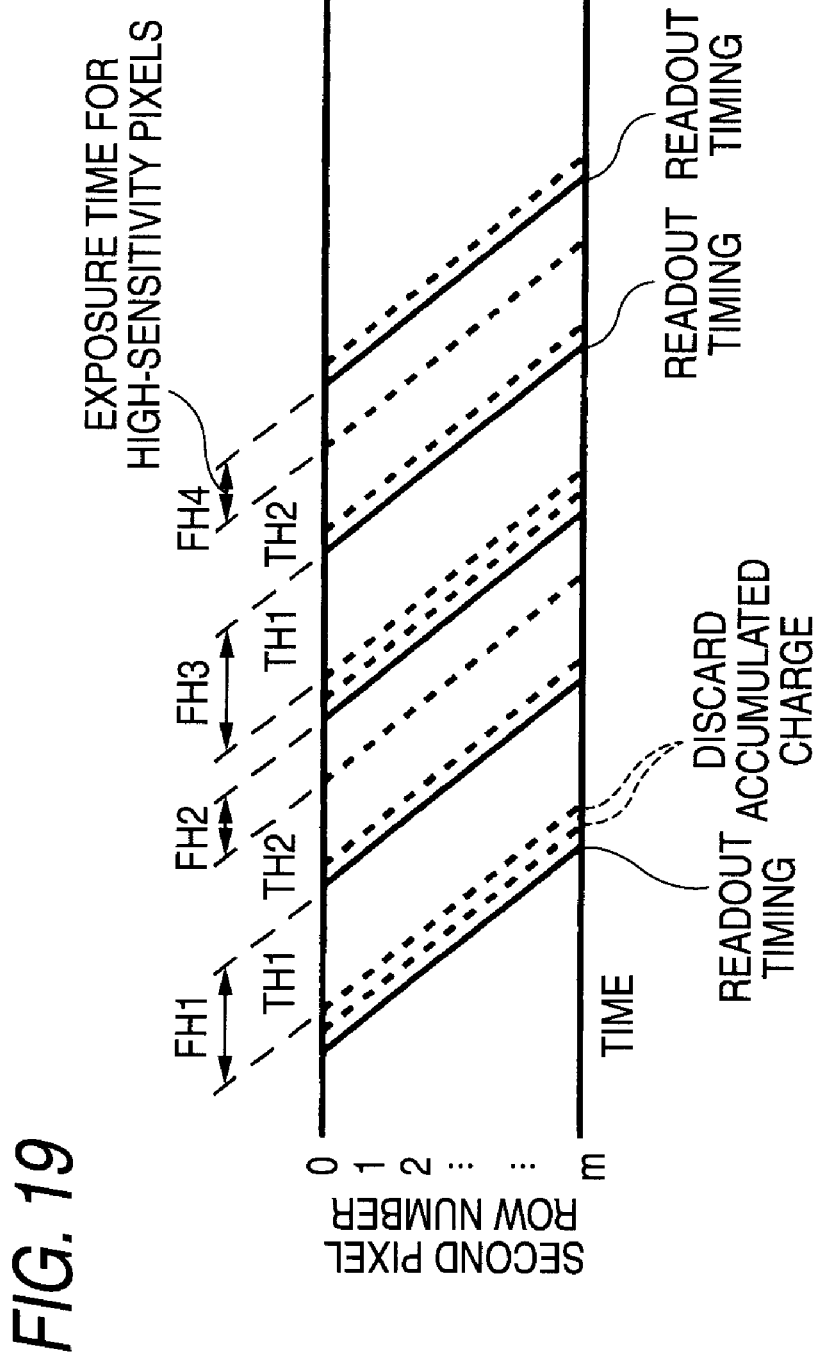
FIG. 19 is a timing chart showing another embodiment (sixteenth example) of the invention.
Figure 20:
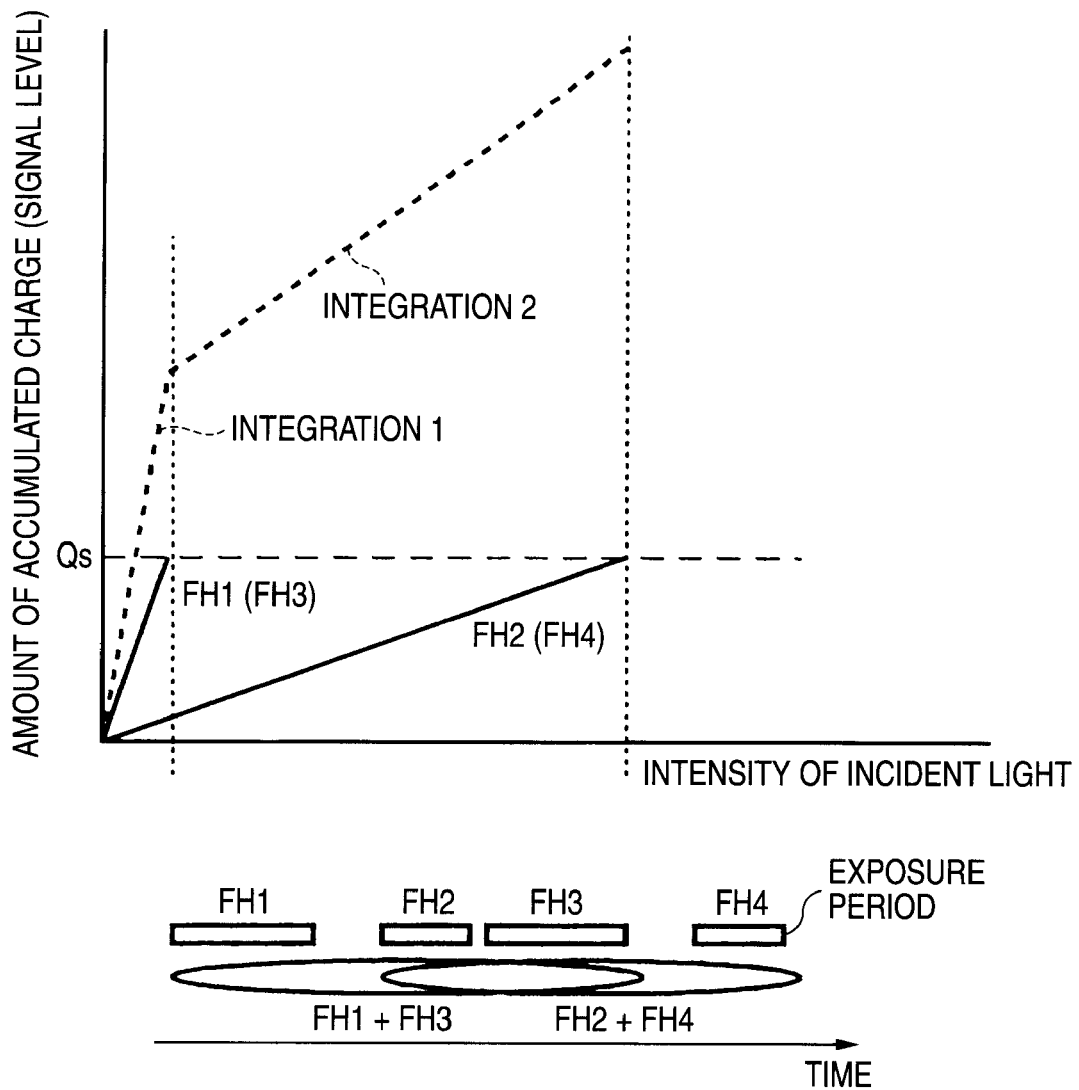
FIG. 20 shows the relationship between the amount of accumulated charge (signal level) and the intensity of incident light as well as a timing chart of the integrated image along exposure period in another embodiment (sixteenth example) of the invention.

Another embodiment (sixteenth example) of the invention will be described below with reference to FIGS. 19 and 20. In the following description, components similar to those used in the previous description have the same reference characters. FIG. 19 shows an example in which multiple types of exposure time are alternately applied. In FIG. 19, the vertical axis represents the pixel row number and the horizontal axis represents time. FIG. 20 shows the characteristic of the integrated image when multiple types of exposure time is used. In FIG. 20, the vertical axis represents the amount of accumulated charge (signal level) and the horizontal axis represents the intensity of incident light. FIG. 20 also shows a timing chart of the integrated image along the exposure period.

The solid-state imaging device of the sixteenth example is configured such that in the solid-state imaging device described in the fifteenth example, two or more types of exposure time are alternately set for the plurality of vertical scan periods of the second pixels 41, which are high-sensitivity pixels.

In the operation in which the multiple types of exposure time are set for the frames described above, the imaging timing significantly varies depending on the incident intensity, so that the integrated image suffers from discrepancy in exposure time depending on the brightness of a moving subject. To address this problem, as shown in FIG. 19, two or more types of exposure time are alternately used for the plurality of frames of the second pixels 41, which are high-sensitivity pixels. In this example, the exposure time TH1 for the frame FH1 and the exposure time TH2 for the frame FH2 are set for the frames FH3 and FH4, respectively.

As shown in FIG. 20, FH1 and FH3, and FH2 and FH4 can handle respective subjects, each having the same intensity of incident light. Since respective types of exposure time are alternately applied, the images in the integration 1 of FH1 and FH3 and the images in the integration 2 of FH2 and FH4 overlap each other in time, allowing reduction in misalignment of exposure time in the integrated image.

In the sold-state imaging device of the sixteenth example, since a plurality of frames, each having different sensitivity, are obtained at different timings, the image acquiring timings are different from each other depending on the brightness of the subject. Thus, by alternately acquiring frames having different exposure periods, by which discrepancy in exposure time is generated in images obtained in respective types of exposure time, for the moving subject, there is provided an advantage of reducing discrepancy in exposure time for the moving subject. This solves the problem of the solid-state imaging device of the fourteenth example, that is, compared to the FH1 image, summing the frames FH1 to FH4 significantly changes the imaging timing for some of the rows and generates discrepancy between the first pixel 31 and the second pixel 41 in an image of the moving subject.

Another embodiment (seventeenth example) of the invention will be described below with reference to FIGS. 21 and 22 to 24. In the following description, components similar to those used in the previous description have the same reference characters. FIGS. 21 and 22 to 24 show examples of a method for selecting frames used for integration. In FIGS. 21 and 22 to 24, the vertical axis represents the row number of the high-sensitivity second pixels and the low-sensitivity first pixels and the horizontal axis represents time.

The solid-state imaging device of the seventeenth example is configured such that in the solid-state imaging devices described in the fourteenth to sixteenth examples, the outputs of a plurality of frames of the second pixels 41 are integrated, and the plurality of frames to be combined for the integration are selected for each row from the frames that at least overlap the exposure period of the first pixels 31.

Figure 21:
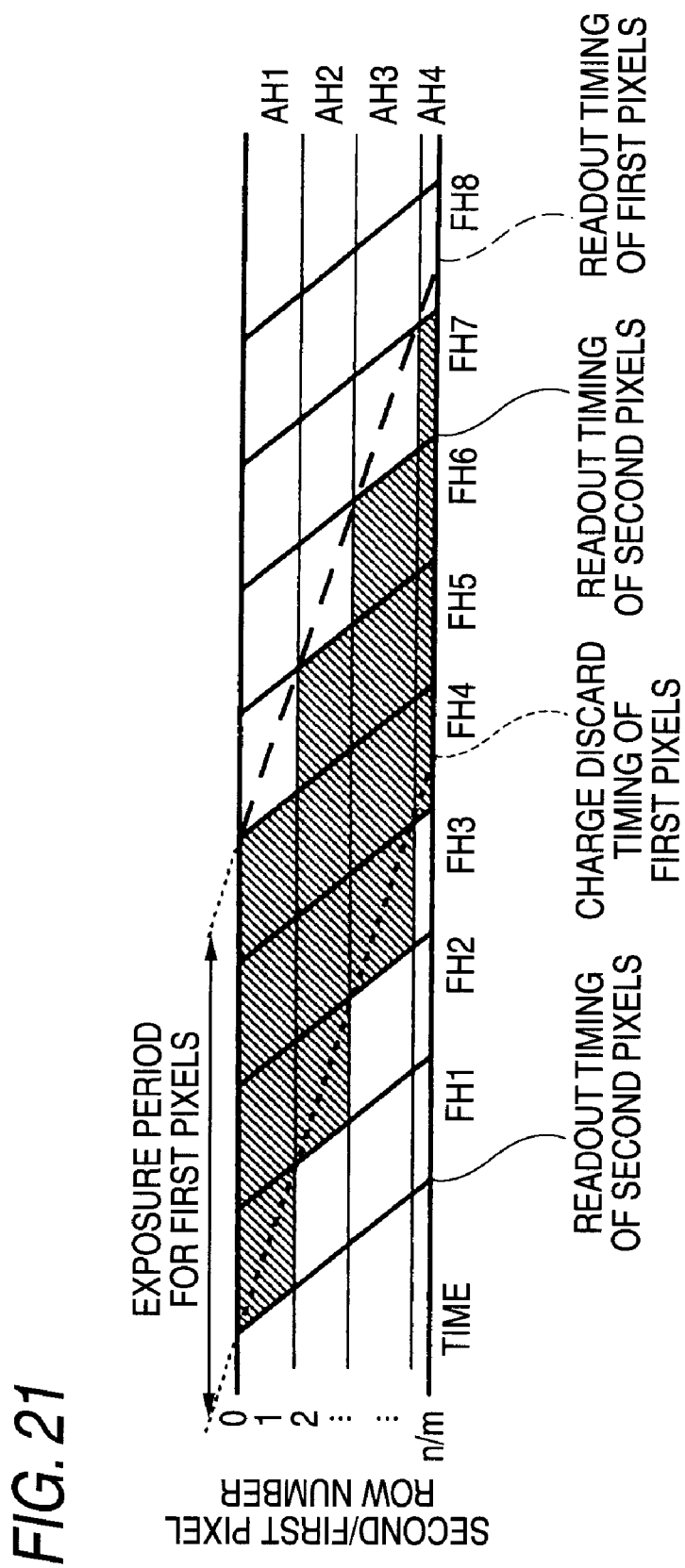
FIG. 21 is a timing chart showing another embodiment (seventeenth example) of the invention.

FIG. 21 shows how to select frames when the outputs of a plurality of frames of the high-sensitivity second pixels 41 are integrated and the plurality of frames to be combined are selected for each row. In each row of the second pixels 41, frames included in the exposure period of the first pixels 31 (the hatched portion in FIG. 21) are selected and integrated. The ranges of rows AH1 to AH4 are separated at the row where the line indicative of the readout timing for the first pixels 31 intersects the line indicative of the readout timing for the second pixels 41. For example, for the rows in the range AH1, the frames FH1 to FH4 are used for integration, while for the rows in the range AH2, the frames FH2 to FH5 are used for integration. In this way, misalignment of exposure time can be reduced.

Figure 22:
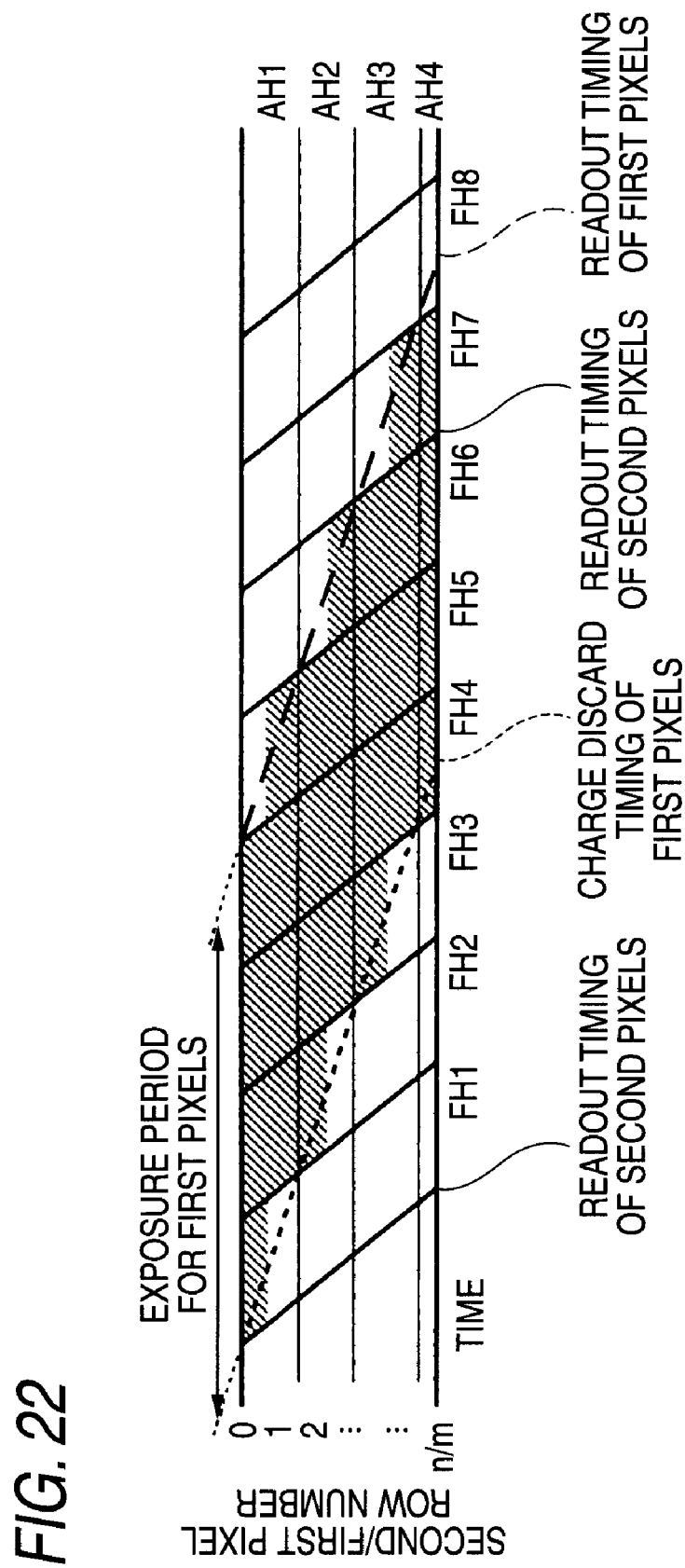
FIG. 22 is a timing chart showing another embodiment (seventeenth example) of the invention.

As shown in FIG. 22, by using the center row of each of the ranges AH1 to AH4 (the hatched portion) as the row used for switching the frames to be selected, the exposure period for the integrated image of the high-sensitivity second pixels 41 approaches the exposure period for the low-sensitivity first pixels 31, allowing reduction in misalignment of exposure time.

Figure 23:
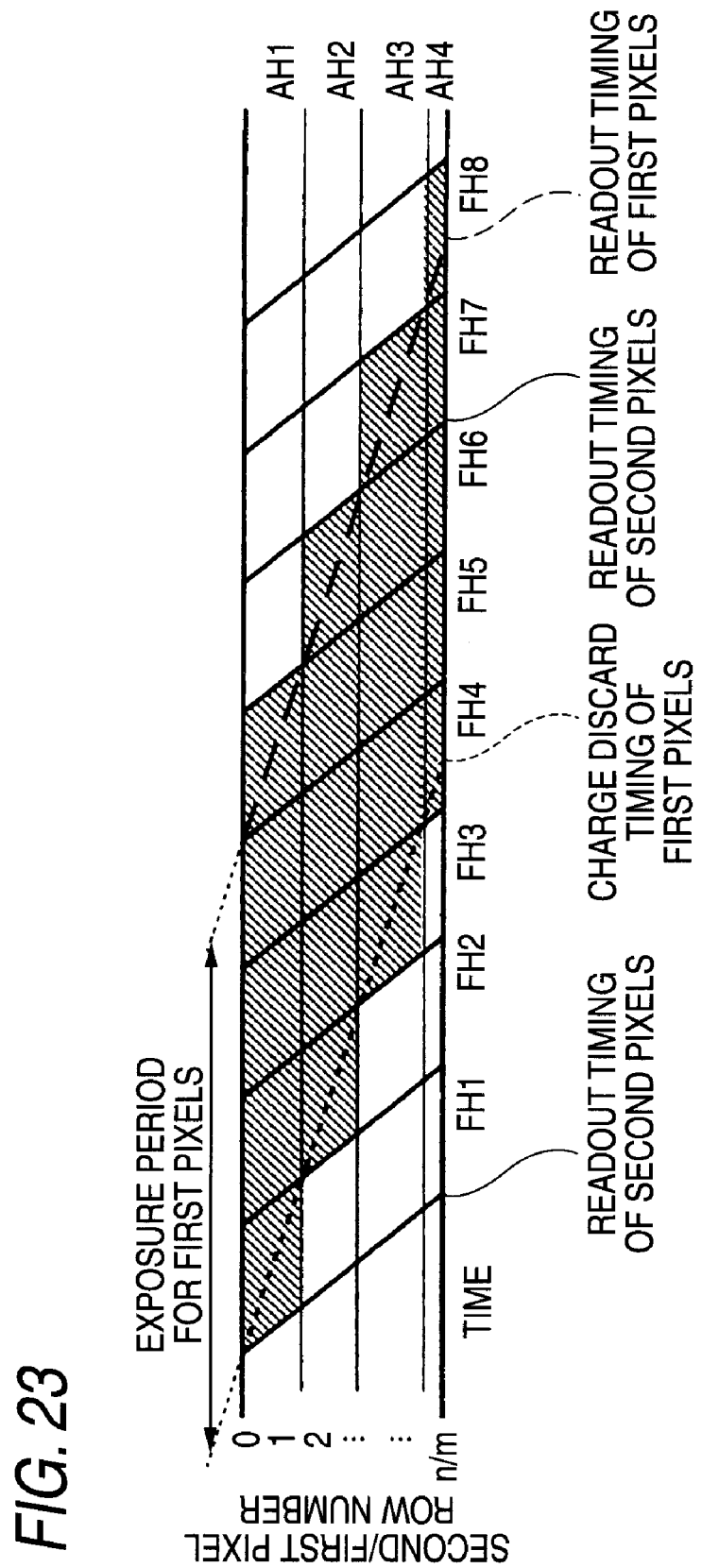
FIG. 23 is a timing chart showing another embodiment (seventeenth example) of the invention.

Furthermore, as shown in FIG. 23, selection is carried out such that the frames used for integrating the high-sensitivity second pixels 41 completely cover the exposure period of the low-sensitivity first pixels 31, allowing reduction in misalignment of exposure time. It is noted that the frames of the second pixels 41 used at the boundary of the exposure periods of the low-sensitivity pixels may also be used in the preceding or following integrated image.

Figure 24:
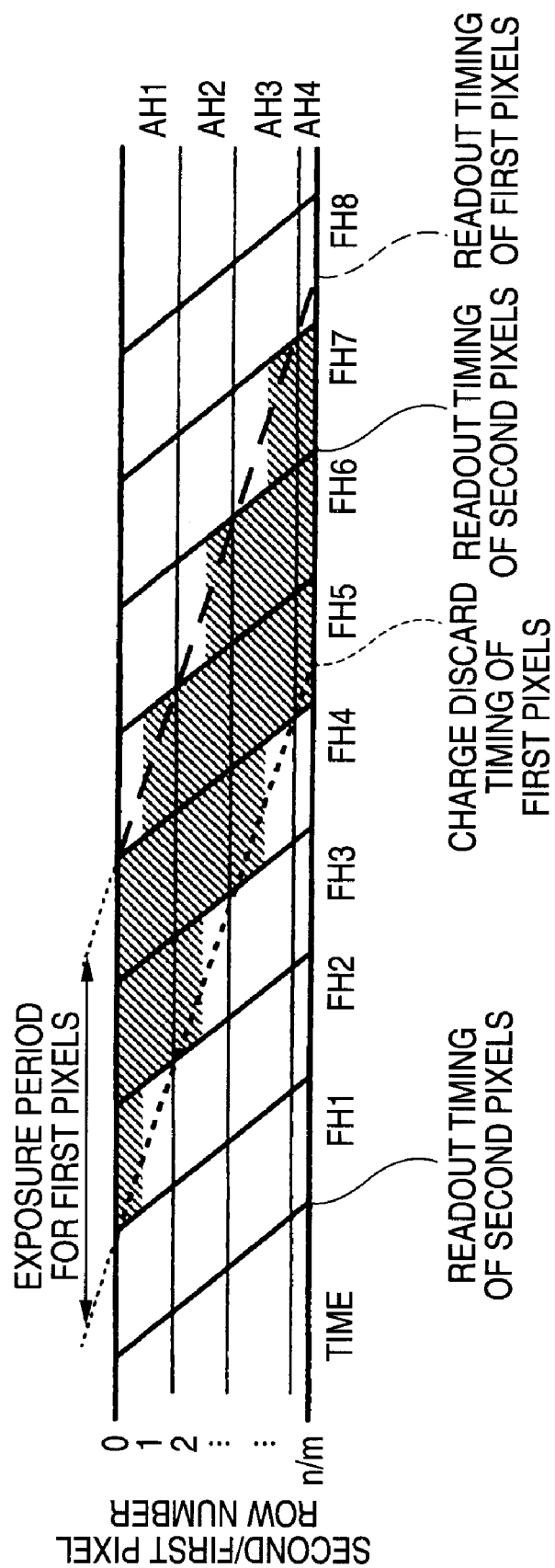
FIG. 24 is a timing chart showing another embodiment (seventeenth example) of the invention.

The number of frames to be selected is determined by the length of the low-sensitivity exposure period. When the exposure time for the first pixels 31 is shortened in the exemplary operation shown in FIG. 22, the number of frames used is changed according to the exposure period for the first pixels 31, as shown in FIG. 24, so as to reduce the misalignment of exposure time.

According to the solid-state imaging device of the seventeenth example, when the vertical scan period of the low-sensitivity first pixel 31 overlaps a plurality of vertical periods of the high-sensitivity second pixel 41, misalignment of exposure time occurs. Selecting frames to be used for integration for each row from a plurality of frames of the second pixels 41 provides an advantage of reducing misalignment of exposure time.

Figure 25:
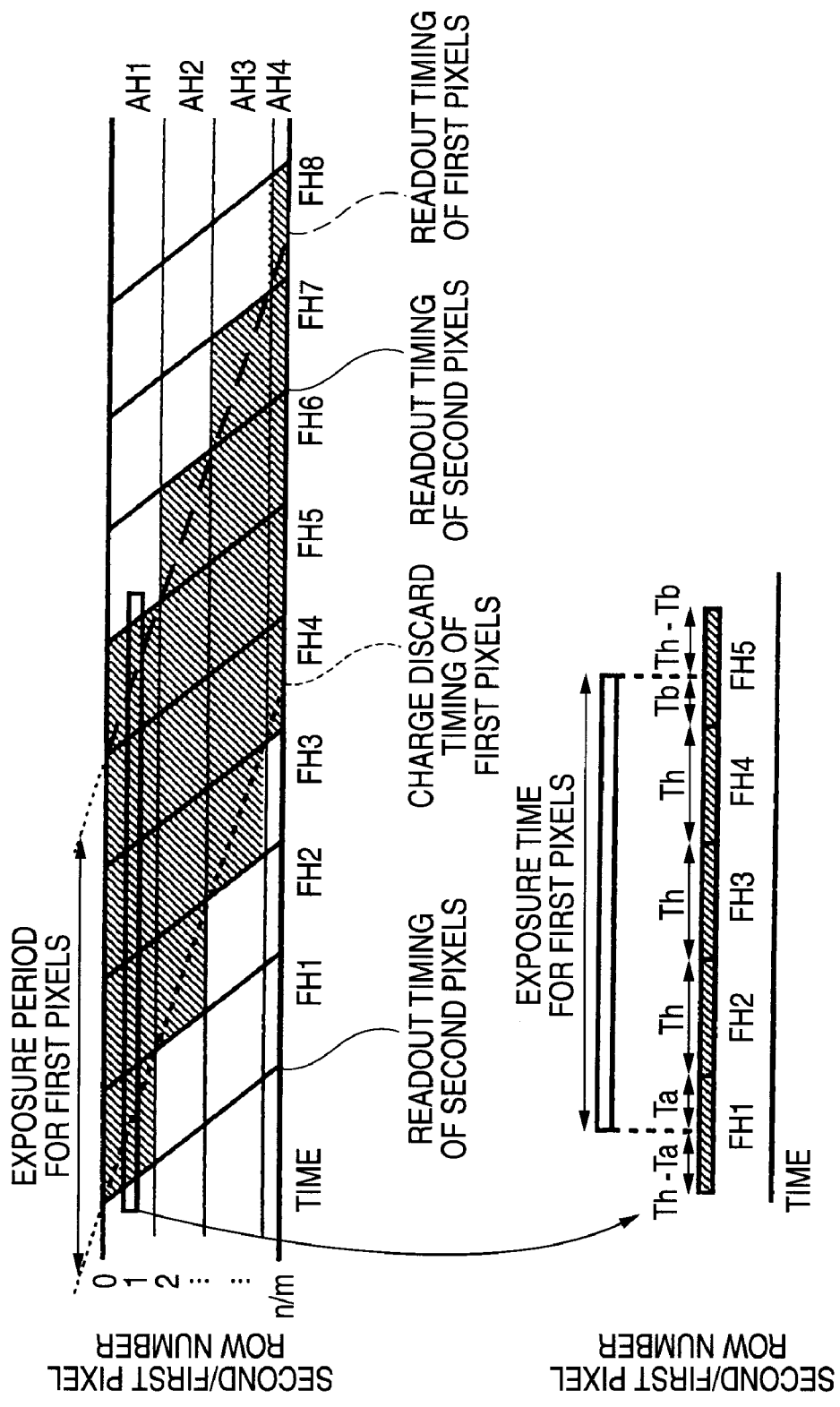
FIG. 25 is a timing chart showing another embodiment (eighteenth example) of the invention.

Another embodiment (eighteenth example) of the invention will be described below with reference to FIGS. 21 and 25. In the following description, components similar to those used in the previous description have the same reference characters. FIG. 25 shows an example of how to select and weigh frames used for integration. In FIG. 25, the vertical axis represents the row number of the high-sensitivity second pixels and the low-sensitivity first pixels and the horizontal axis represents time.

The solid-state imaging device of the eighteenth example is configured such that in the solid-state imaging device described in the seventeenth example, the outputs of the plurality of frames of the second pixels 41 are multiplied by different weight coefficients for each row, followed by summing the weighed outputs.

That is, as shown in FIG. 21, by multiplying the outputs of the frames of the high-sensitivity second pixels 41 by different weight coefficients for each row, followed by summing the weighed outputs, discontinuity of the misalignment of exposure time can be reduced. For example, as described in the seventeenth example, in the method of switching the frames to be selected, there is discontinuity in the amount of misalignment of exposure time at the row where the frame selection is switched, for example, the boundary of AH1 and AH2 in FIG. 21. According to this example, this discontinuity will be reduced.

As shown in FIG. 25, a plurality of frames of the high-sensitivity second pixels 41 that cover the preceding and following portions of the exposure period of the low-sensitivity first pixels 31 (hatched portion) are selected for each row. Now focusing on a row i, the exposure period T1 of the first pixels 31 is included within the exposure period of a plurality of frames FH1 to FH5 of the second pixels 41. Only Ta and Tb of the exposure periods of the frames FH1 and FH5 of the second pixels 41, which are the boundaries of the exposure period of the first pixels 31, overlap the exposure period of the first pixels 31. Now letting W2 to W4 be the weights for the frames FH2 to FH4 that are completely included within the exposure period of the first pixels 31, the signal levels obtained from the frames FH1 to FH5 are multiplied by $W1:W2:W3:W4:W5=Ta:Th:Th:Th:Tb$ as the weights for the frames FH1 to FH5 and summed to integrate images. Since the weight multiplied to the boundary frame continuously changes for each row, the misalignment of the exposure time and the discontinuity thereof will be reduced.

According to the solid-state imaging device of the eighteenth example, when images are integrated, multiplying the frames by different weight coefficients for each row, followed by summing the weighed frames provides an advantage of eliminating the misalignment (discontinuity) of exposure period at the row where the selection of the frames used for integration is switched, which is the problem with the solid-state imaging device of the seventeenth example.

Figure 26:
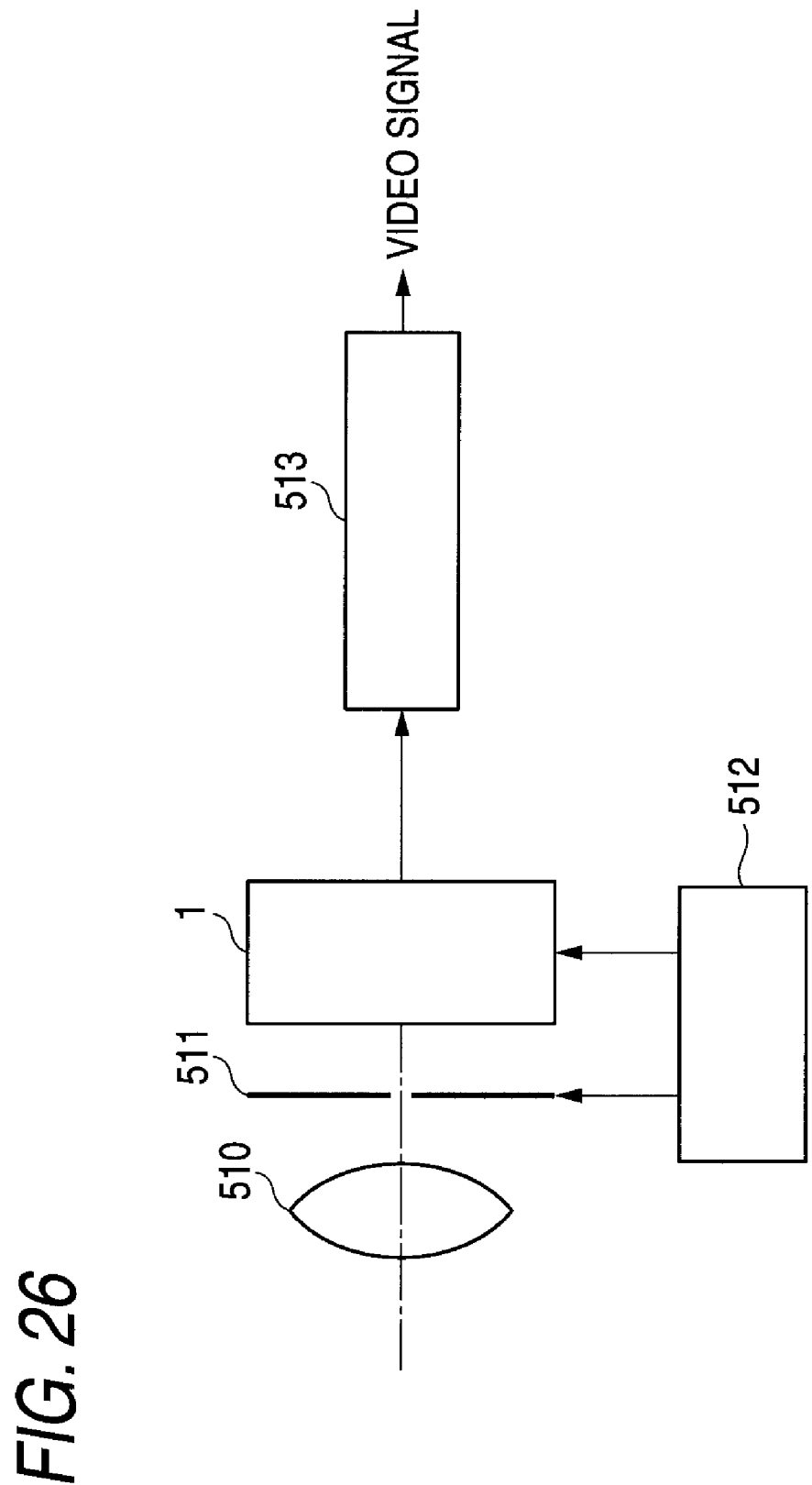
FIG. 26 is a cross-sectional view of a camera according to an embodiment of the invention.

FIG. 26 shows a cross-sectional view of a camera of an embodiment according to the first to eighteenth examples. The camera according to this embodiment is an example of a video camcorder capable of imaging moving pictures.

The camera according to this embodiment includes a solid-state imaging device 1, an optical system 510, a shutter 511, a drive circuit 512 and a signal processing circuit 513.

The optical system 510 focuses image light (incident light) from a subject onto the imaging plane of the solid-state imaging device 1, so that the signal charge is accumulated in the solid-state imaging device 1 for a fixed period of time.

The shutter 511 controls the light exposure period and the light blocking period for the solid-state imaging device 1.

The drive circuit 512 supplies drive signals that control the transfer operation of the solid-state imaging device 1 and the shutter operation of the shutter 511. The drive signal (timing signal) supplied from the drive circuit 512 transfers the charge from the solid-state imaging device 1. The signal processing circuit 513 carries out various signal processing. The video signal that has undergone the signal processing is stored in a storage medium, such as a memory, or outputted to a monitor.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a plurality of first pixels;
a plurality of second pixels having a higher sensitivity than the first pixels;
a first control signal line that controls the first pixels; and
a second control signal line that controls the second pixels, wherein,
the first control signal line and the second control signal line are driven independently.

2. The solid-state imaging device according to claim 1, wherein an output signal line of the first pixels and an output signal line of the second pixels are wired independently.

3. The solid-state imaging device according to claim 1, wherein
the plurality of first pixels are two-dimensionally arranged and the plurality of second pixels are two-dimensionally arranged such that they are shifted from each other by one-half the pixel pitch in the horizontal and vertical directions.

4. The solid-state imaging device according to claim 1, wherein the first pixels and the second pixels are arranged in a alternating pattern.

5. The solid-state imaging device according to claim 1, further comprising:
at least one first optical filter formed over at least one of the plurality of first pixels; and
at least one second optical filter formed over at least one of the plurality of second pixels,
the spectral characteristic of the second optical filter is different from the spectral characteristic of the first optical filter.

6. The solid-state imaging device according to claim 1, wherein the plurality of second pixels include pixels with an optical filter and pixels without an optical filter.

7. The solid-state imaging device according to claim 5, the first optical filter is a color filter filtering at least one of the three primary colors of light and complementary colors.

8. The solid-state imaging device according to claim 1, wherein the exposure period for the first pixels is controlled independent of the exposure period for the second pixels.

9. The solid-state imaging device according to claim 1, wherein
a unit row includes the first and second pixels arranged in a horizontal direction, and
the electrons accumulated in the pixels included in each unit row are discharged before the exposure is initiated.

10. The solid-state imaging device according to claim 9, wherein the timing of the discharging of accumulated electrons from the pixels in each row is controlled independently for the arrangements of the first pixels and the second pixels before exposure is initiated.

11. The solid-state imaging device according to claim 1, wherein
a row unit includes the plurality of first and second pixels arranged in the horizontal direction, and
the discharging of accumulated electrons from the pixels in each row is simultaneously controlled for a plurality of rows before exposure is initiated.

12. The solid-state imaging device according to claim 11, wherein the electrons accumulated in the second pixels are discharged later than the first pixels and before exposure is initiated.

13. The solid-state imaging device according to claim 1, wherein the readout rate of the second pixels is higher than the readout rate of the first pixels.

14. The solid-state imaging device according to claim 13, wherein the vertical scan period of the first pixels overlaps a plurality of vertical scan periods of the second pixels.

15. The solid-state imaging device according to claim 13, wherein two or more types of exposure times are set for a plurality of vertical scan periods of the second pixels.

16. The solid-state imaging device according to claim 15, wherein two or more types of exposure times are alternately set for the plurality of vertical scan periods of the second pixels.

17. The solid-state imaging device according to claim 14, wherein
a plurality of frames that overlap at least the exposure period of the first pixels are outputted from the second pixels and combined, and
the plurality of combined frames are integrated.

18. The solid-state imaging device according to claim 17, wherein the outputs of the plurality of frames of the second pixels are multiplied by different weight coefficients for each row, and the weighed outputs are summed.

19. A method for driving a solid-state imaging device including an array of a plurality of first pixels and a plurality of second pixels with higher sensitivity than the first pixels the method including the steps of:
controlling the first pixels using a first control signal line; and
controlling the second pixels using a second control signal line;
driving the first control signal line and the second control signal line independently.

20. A camera comprising:
a plurality of first pixels;
a plurality of second pixels with a higher sensitivity than the first pixels;
a first control signal line that controls the first pixels; and
a second control signal line that controls the second pixels, wherein,
the first control signal line and the second control signal line are driven independently.

* * * * *